United States Patent
Jevtic et al.

(10) Patent No.: US 11,354,752 B2
(45) Date of Patent: Jun. 7, 2022

(54) SYSTEMS AND METHODS FOR A SIMULATION PROGRAM OF A PERCOLATION MODEL FOR THE LOSS DISTRIBUTION CAUSED BY A CYBER ATTACK

(71) Applicant: ARIZONA BOARD OF REGENTS ON BEHALF OF ARIZONA STATE UNIVERSITY, Tempe, AZ (US)

(72) Inventors: Petar Jevtic, Chandler, AZ (US); Nicolas Lanchier, Gilbert, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 17/276,004

(22) PCT Filed: Sep. 13, 2019

(86) PCT No.: PCT/US2019/051091
§ 371 (c)(1),
(2) Date: Mar. 12, 2021

(87) PCT Pub. No.: WO2020/056314
PCT Pub. Date: Mar. 19, 2020

(65) Prior Publication Data
US 2021/0256623 A1     Aug. 19, 2021

Related U.S. Application Data

(60) Provisional application No. 62/730,649, filed on Sep. 13, 2018.

(51) Int. Cl.
*G06Q 10/06*     (2012.01)
*G06Q 10/10*     (2012.01)
(Continued)

(52) U.S. Cl.
CPC .......... *G06Q 40/08* (2013.01); *G06F 21/552* (2013.01); *G06N 20/20* (2019.01); *G06Q 10/067* (2013.01);
(Continued)

(58) Field of Classification Search
CPC ......... G06Q 10/06; G06Q 10/10; G06Q 40/08
(Continued)

(56) References Cited

U.S. PATENT DOCUMENTS

| | | | | |
|---|---|---|---|---|
| 10,148,680 B1 * | 12/2018 | Segev | ................ | H04L 63/1425 |
| 2014/0108089 A1 * | 4/2014 | Abercrombie | ..... | G06Q 10/0635 |
| | | | | 705/7.28 |

(Continued)

FOREIGN PATENT DOCUMENTS

WO     2016109608 A1     7/2016

OTHER PUBLICATIONS

International Search Report and Written Opinion issued in corresponding International Application No. PCT/US2010/051091 dated Nov. 19, 2019, 14 pages.
(Continued)

*Primary Examiner* — Nga B Nguyen
(74) *Attorney, Agent, or Firm* — Polsinelli PC

(57) ABSTRACT

Aspects of the present disclosure relate to implementation of a dynamical structural percolation model, that may be implemented via at least one computing device, and models the loss distribution for cyber risk due to breach of IT networks of a single small or medium-sized enterprise, which is believed to be a technical improvement responsive to the foregoing issues and challenges with known risk/loss distribution models.

8 Claims, 9 Drawing Sheets

(51) Int. Cl.
*G06Q 40/08* (2012.01)
*G06N 20/20* (2019.01)
*G06F 21/55* (2013.01)
*H04L 9/40* (2022.01)

(52) U.S. Cl.
CPC ...... *H04L 63/1408* (2013.01); *H04L 63/1433* (2013.01); *G06F 2221/034* (2013.01)

(58) Field of Classification Search
USPC .................................................. 705/7.28
See application file for complete search history.

(56) References Cited

U.S. PATENT DOCUMENTS

| | | | | |
|---|---|---|---|---|
| 2015/0106941 | A1* | 4/2015 | Muller | H04L 63/1433 726/25 |
| 2015/0244681 | A1* | 8/2015 | Blumenfeld | H04W 12/04 713/168 |
| 2016/0012235 | A1* | 1/2016 | Lee | G06K 9/00442 726/25 |
| 2017/0039374 | A1* | 2/2017 | Rubin | G06F 21/52 |
| 2017/0046519 | A1* | 2/2017 | Cam | G06N 7/005 |
| 2017/0126712 | A1 | 5/2017 | Crabtree et al. | |
| 2017/0300911 | A1* | 10/2017 | Alnajem | G06Q 10/0635 |
| 2018/0046796 | A1* | 2/2018 | Wright | G06F 21/45 |
| 2018/0113442 | A1* | 4/2018 | Nixon | G05B 19/4184 |
| 2019/0052653 | A1* | 2/2019 | Galula | G06F 21/55 |
| 2019/0312881 | A1* | 10/2019 | Dasgupta | H04L 63/105 |

OTHER PUBLICATIONS

Shah et al., Finding Rumor Sources on Random Trees, Operations Research, Nov. 3, 2015. Retrieved Nov. 1, 2019 from <https://arxiv.org/pdf/1110.6230.pdf>.

Bouveret, Cyber risk for the financial sector: a framework for quantitative assessment, International Monetary Fund. Jan. 2018. Retrieved Nov. 1, 2019 from <https://www.researchgate.net/profile/Antoine_Bouveret2/publication/326472318_Cyber_Risk_for_the_Financial_Sector_A_Framework_for_Quantitative_Assessment/links/5cebc8d392851c4eabc17d02/Cyber-Risk-for-the-financial-Sector-A-Framework-for-Quantitative_Assessment.pdf>.

Shourabi, A Model for Cyber Attack Risks in Telemetry Networks, International Foundation for Telemetering. Oct. 2015. Retrieved on Nov. 1, 2019 from <https://www.morgan.edu/Documents/ACADEMICS/DEPTS/ElectricEng/ITC%2015%20Cyber%20Risk%20Model.pdf>.

Bicsi, Network design basics for cabling professionals, McGraw-Hill Professionals, 2002.

Biener, et al., Insurability of cyber risk: An empirical analysis, The Geneva Papers on Risk and Insurance-Issues and Practice, 40(1):131-158, 2015.

Cebula, et al., A taxonomy of operational cyber security risks version 2, Technical report, Carnegie-Mellon Univ, Pittsburgh PA Software Engineering Inst., 2014.

Edwards, et al., Hype and heavy tails: A closer look at data breaches, Journal of Cybersecurity, 2(1):3-14, 2016.

Eling, et al., Data breaches; Goodness of fit, pricing, and risk measurement, Insurance: Mathematics and Economics, 75:126-136, 2017.

Eling, et al., What do we know about cyber risk and cyber risk insurance?, The Journal of Risk Finance, 17(5):474-491, 2016.

Fahrenwaldt, et al., Pricing of cyber insurance contracts in a network model, 2017.

Maillart, et al., Heavy-tailed distribution of cyber-risks, The European Physical Journal B, 75(3):357-364, 2010.

Wheatley, et al., The extreme risk of personal data breaches and the erosion of privacy, The European Physical Journal B, 89(1):7, 2016.

* cited by examiner

SYSTEMS AND METHODS FOR A SIMULATION PROGRAM OF A PERCOLATION MODEL FOR THE LOSS DISTRIBUTION CAUSED BY A CYBER ATTACK

CROSS REFERENCE TO RELATED APPLICATIONS

This is a non-provisional application that claims benefit to U.S. provisional patent application Ser. No. 62/730,649 filed on Sep. 13, 2018, which is herein incorporated by reference in its entirety.

FIELD

The present disclosure generally relates to a model for loss distribution of cyber risk; and in particular, to systems and methods for a percolation model for the loss distribution caused by a cyberattack.

BACKGROUND

According to the European Solvency II Directive, operational risk, of which cyber risk is a part, is defined as the risk of loss arising from inadequate or failed internal processes, personnel or systems, or from external events. This definition, albeit presented in general terms, highlights financial loss as its key aspect. In contrast, in the current actuarial literature on cyber risk, the most frequently cited definition of cyber risk is given in the work of, which describes cyber risks as 'operational risks to information and technology assets that have consequences affecting the confidentiality, availability, or integrity of information or information systems'. While this definition captures well the phenomenon of cyber risk as seen from a computer science perspective, it does not characterize any associated financial losses or risks, which are essential for the actuarial community. A more recent definition by attempts to reconcile the previous two by stating that 'cyber risk means any risk of financial loss, disruption or damage to the reputation of an organization from some sort of failure of its information technology systems'. As the goal of this work is to consider only losses that occur as a result of actions from unauthorized breaches of IT systems, which constitute a substantial component of cyber risk, all of the previously given definitions remain too broad, since they encompass financial losses resulting both from external and internal sources under various motivations of the agents involved. Instead, we will precisely define the aspect of cyber risk which we consider and refer to as cyber risk due to breach in the following way: cyber risk due to breach is 'the risk of a financial loss caused by a breach of an institution's IT infrastructure by unauthorized parties, resulting in exploitation, taking possession of, or disclosure of data assets'.

The McKinsey 2018 report reveals that, globally, companies invested $500 M in cyber-security in 2017, but have nonetheless incurred dramatic losses estimated at $400 B. The findings of the reports further underline the importance of cyber risk and its financial implications. Clearly, the existing situation creates a considerable opportunity for insurers to open new product lines and capitalize on this new risk type, while providing a useful insurance product to consumers. In order for this to be achieved in a sustainable manner, a proper pricing mechanism for this new type of risk has to be developed. Therefore, a better understanding of cyber risk and its pricing carries importance for both the academic and practitioner actuarial communities, as well as for the society at large.

Insurance risk pricing is methodologically driven largely by the existence of a loss distribution for a particular risk. Once that loss distribution is known, the price of an insurance product to protect against the risk whose materialization induced the loss distribution can be ascertained by means of well-established actuarial methods, and is dependent on use of appropriate risk measures. In practice, only after sufficient time has passed and enough data points have been collected, the empirical loss distribution is revealed, and, as such, can become a basis for pricing of insurance products.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
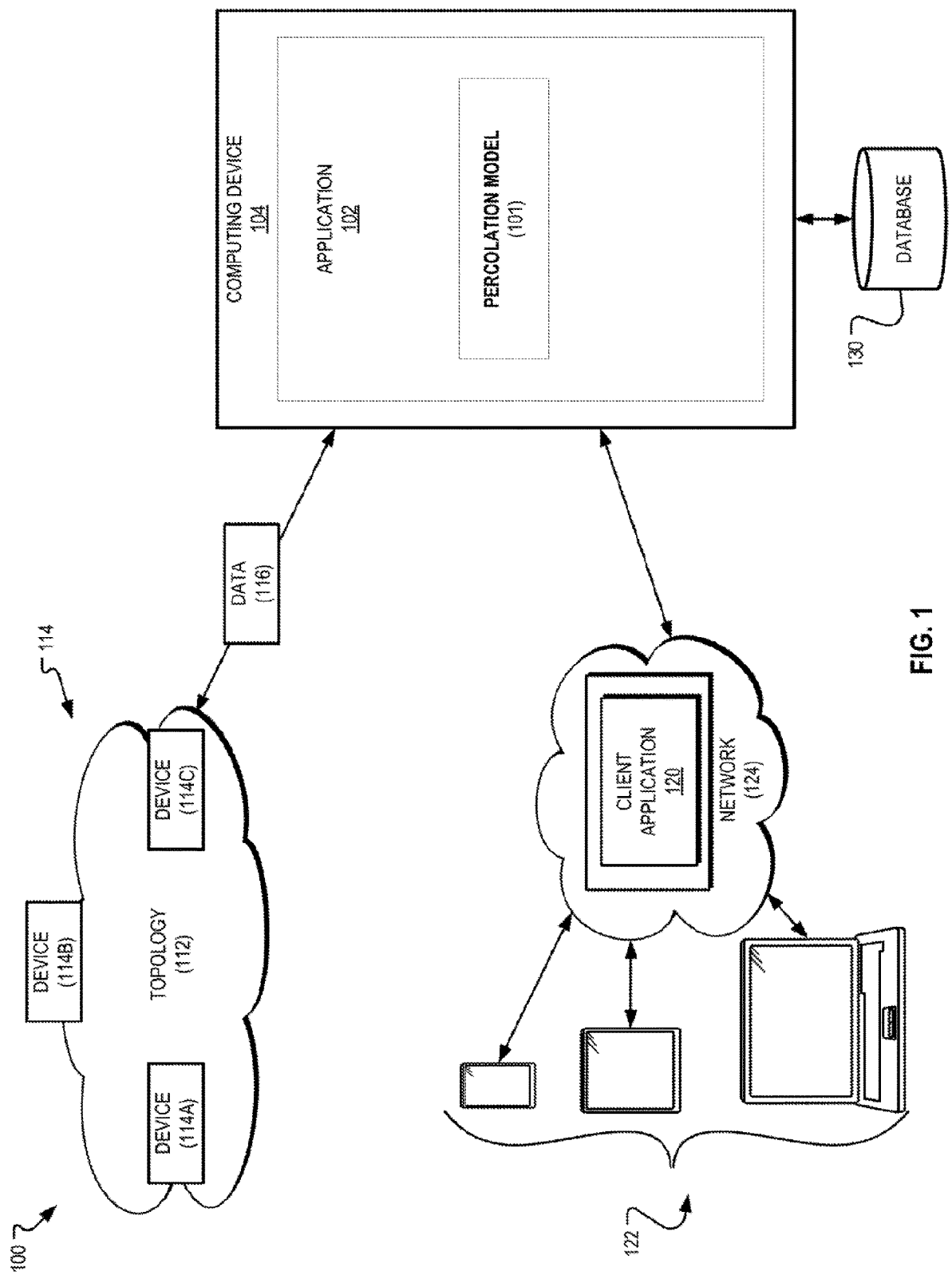
FIG. 1 is a simplified block diagram of a system or network for implementing the percolation model described herein.
Figure 2A:
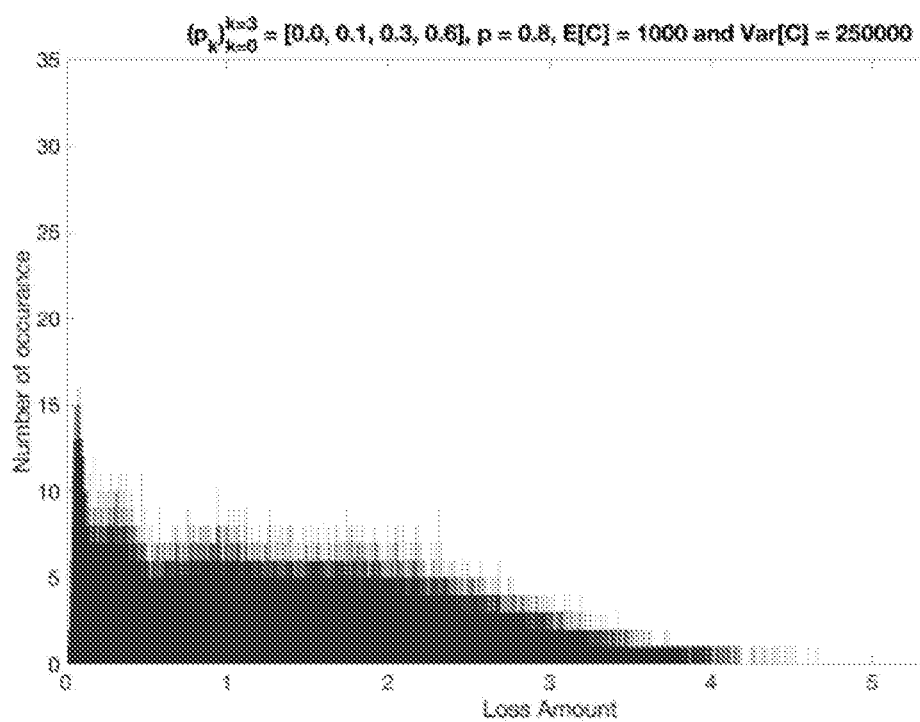
FIGS. 2A-2F are histograms of loss of cyber risk due to breach random variable based on one million simulations. The Log-normally distributed costs are considered under the assumption of random tree LAN topology and two probabilities of edge contagion. The presented case is of high volatility of cost.
Figure 2B:
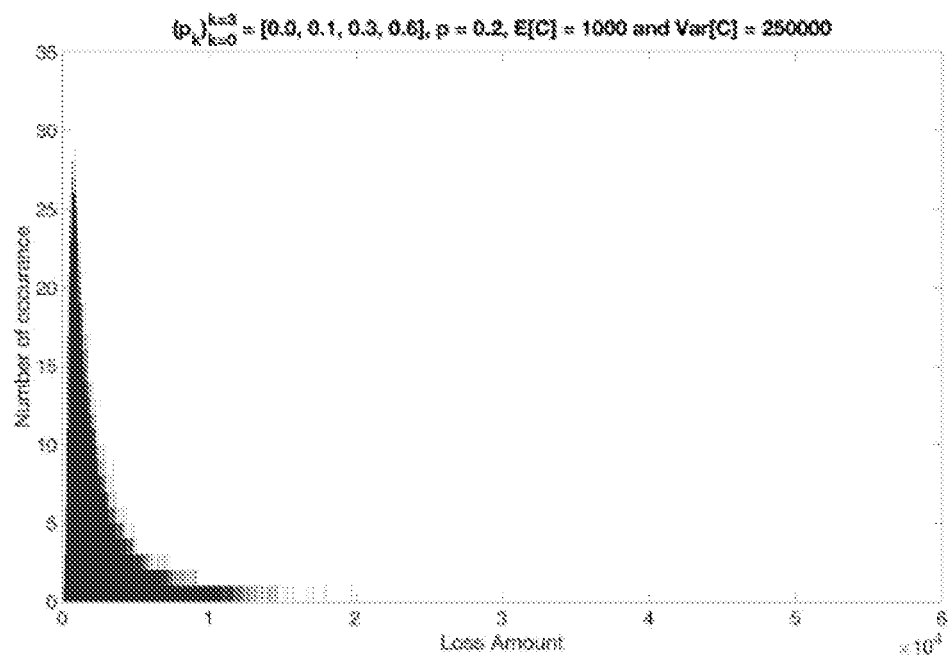
Figure 2C:
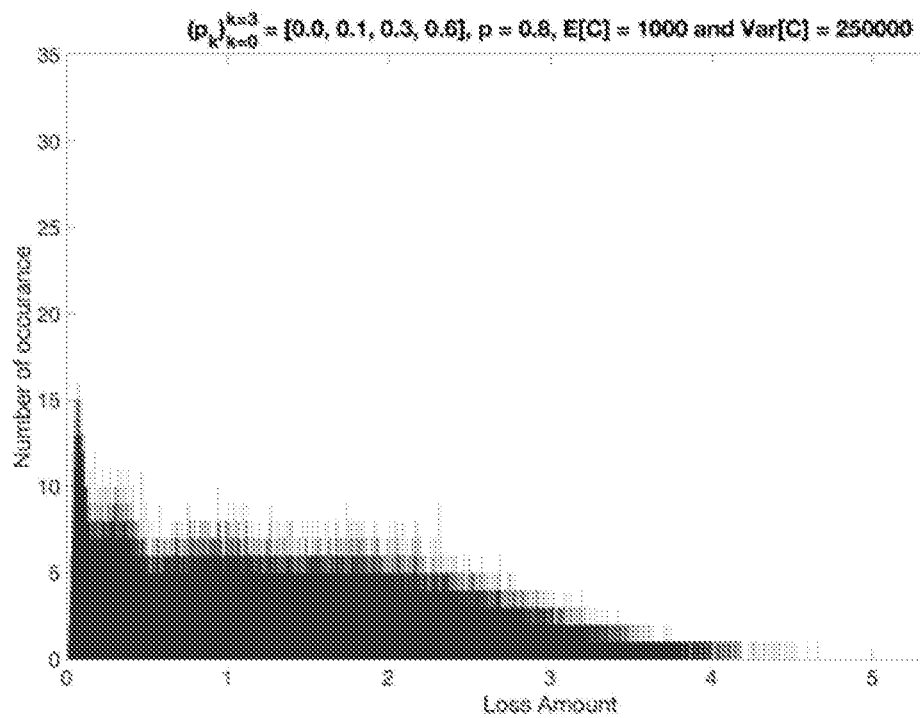
Figure 2D:
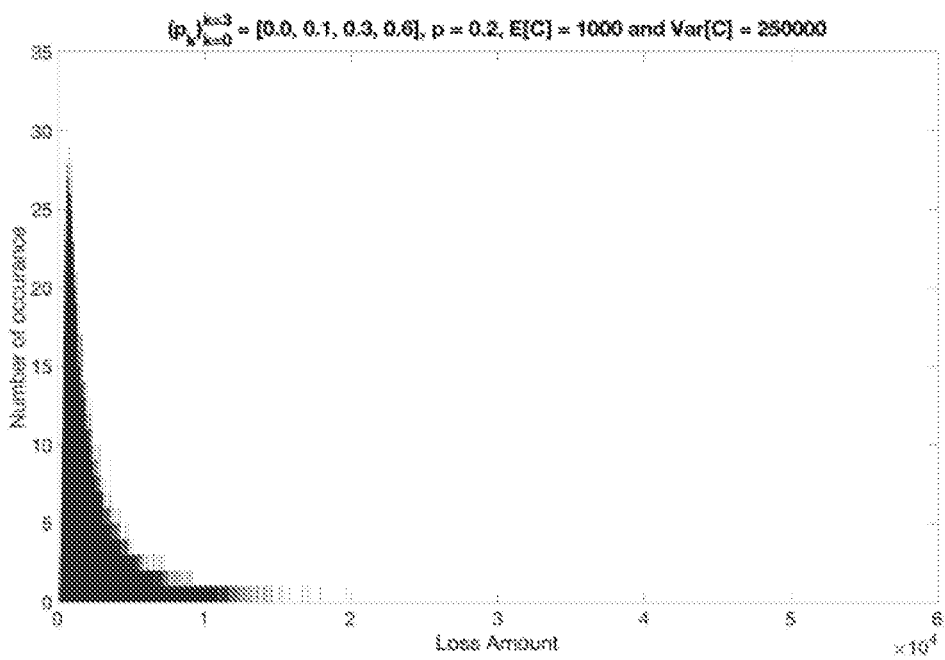
Figure 2E:
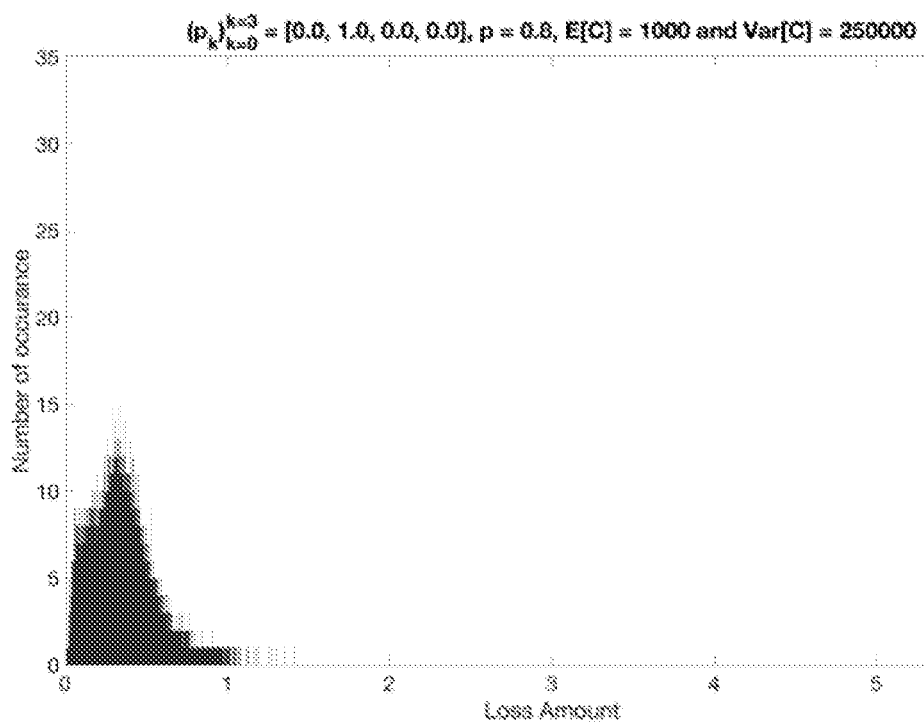
Figure 2F:
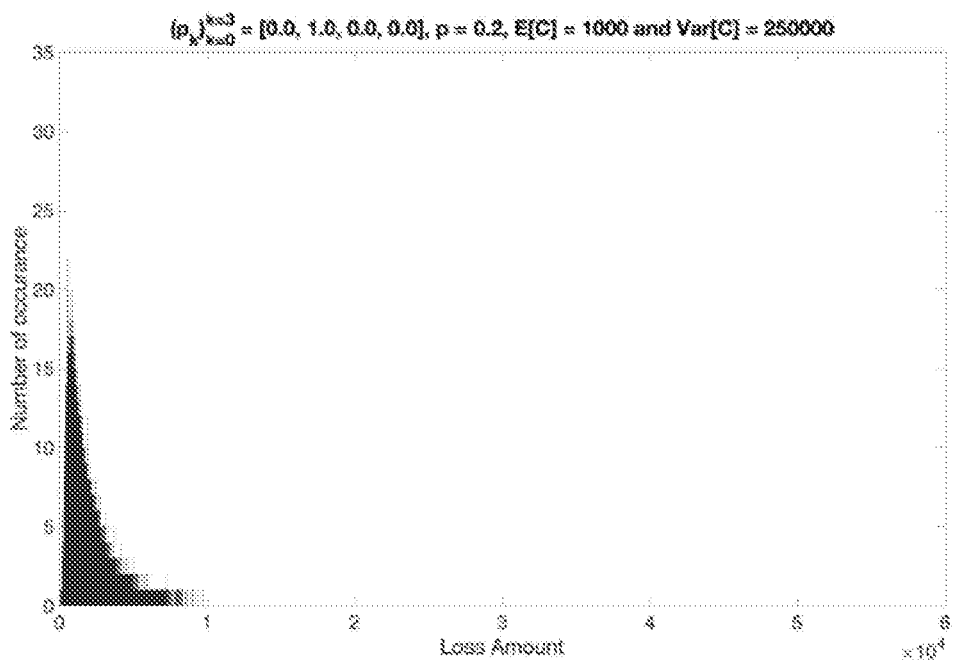
Figure 3A:
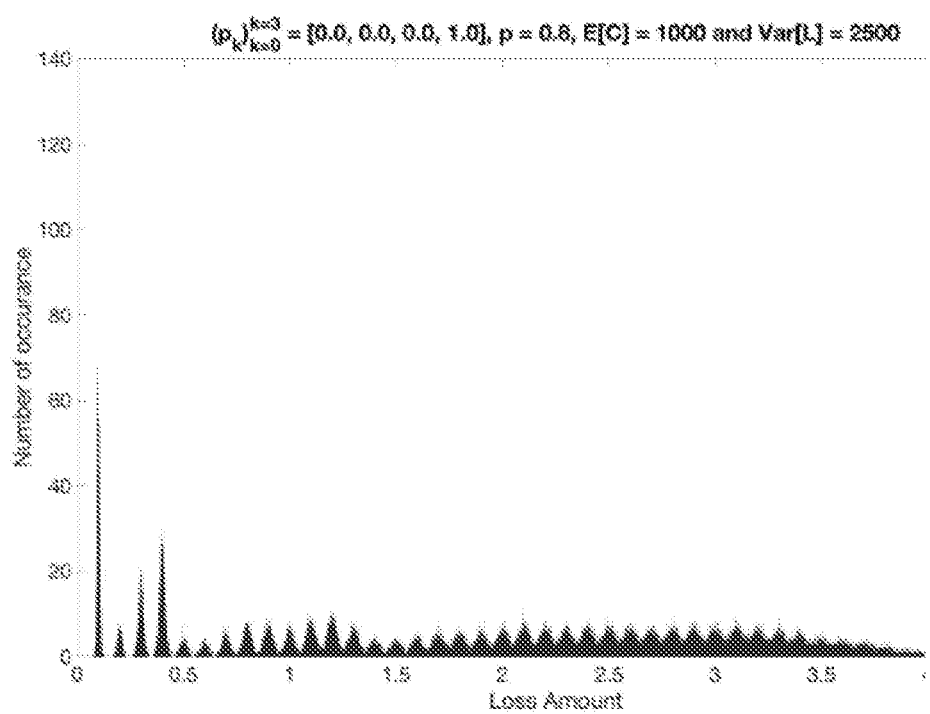
FIGS. 3A-3F are histograms of loss of cyber risk due to breach random variable based on one million simulations. The Log-normally distributed costs are considered under the assumption of random tree LAN topology and two probabilities of edge contagion. The presented case is of low volatility of cost.
Figure 3B:
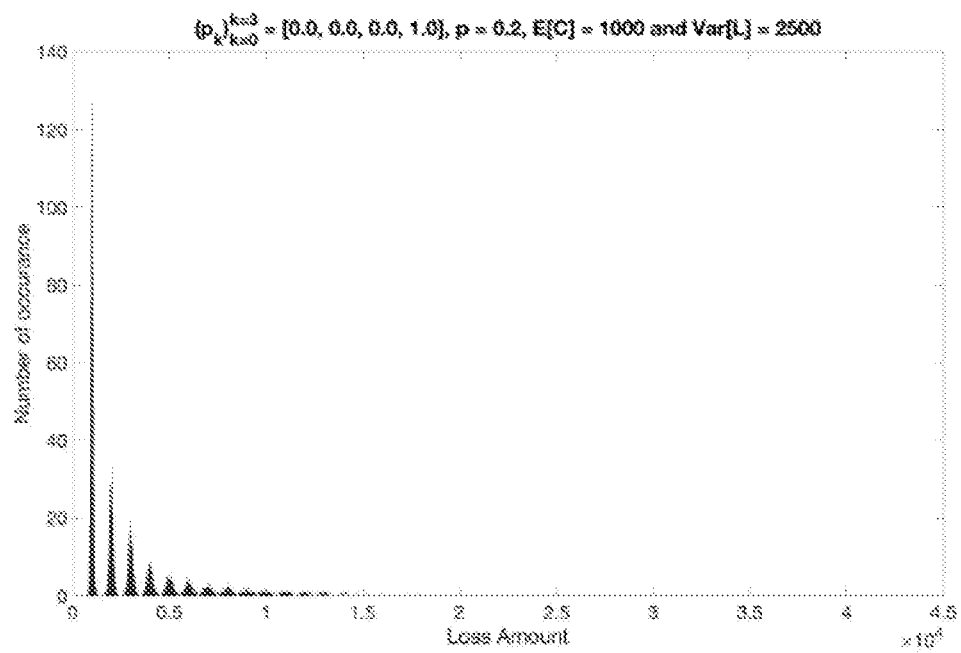
Figure 3C:
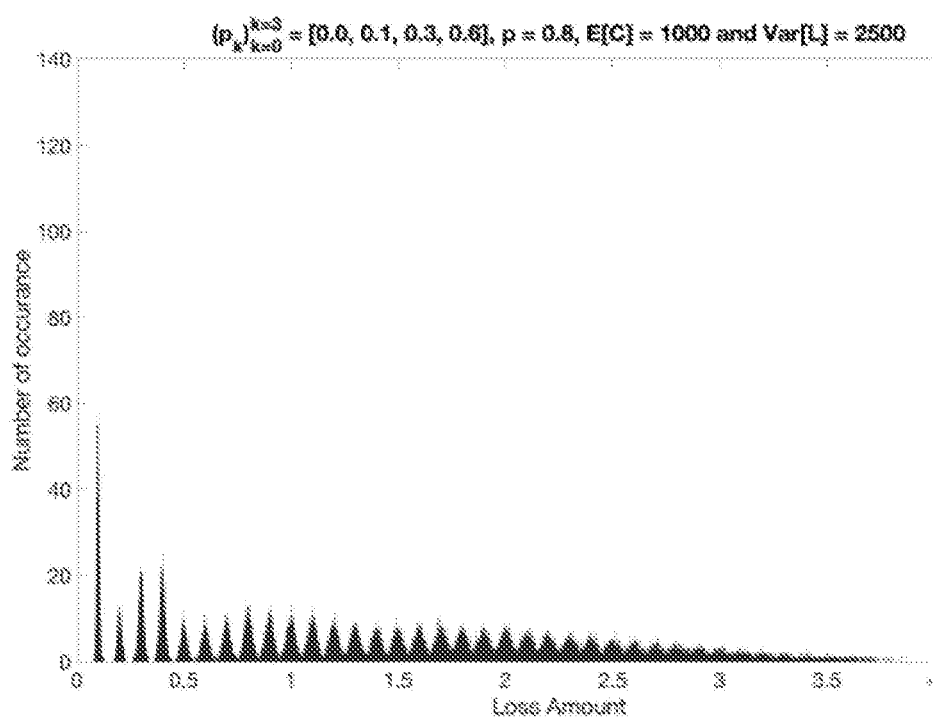
Figure 3D:
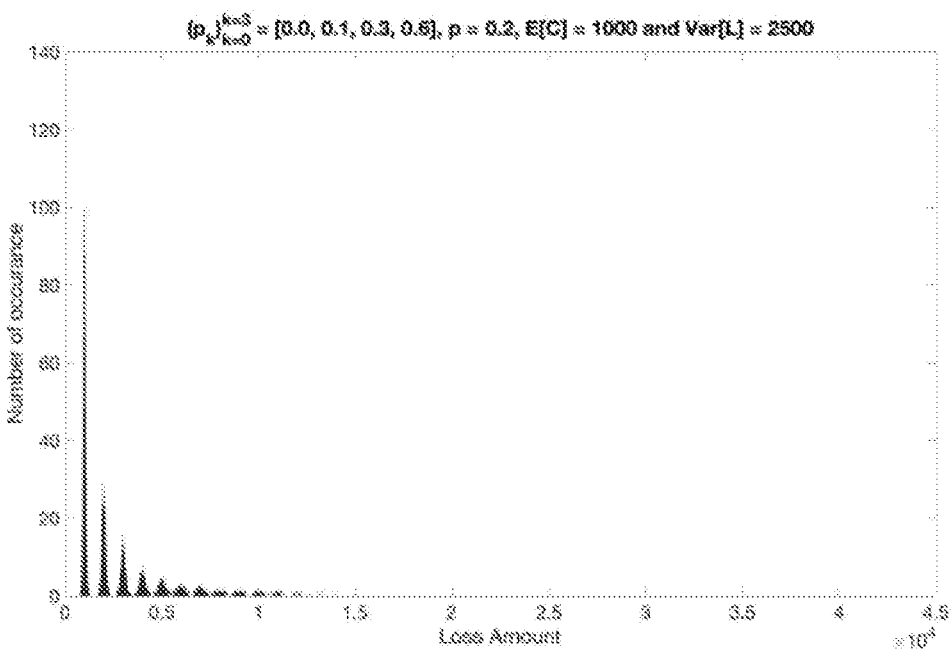
Figure 3E:
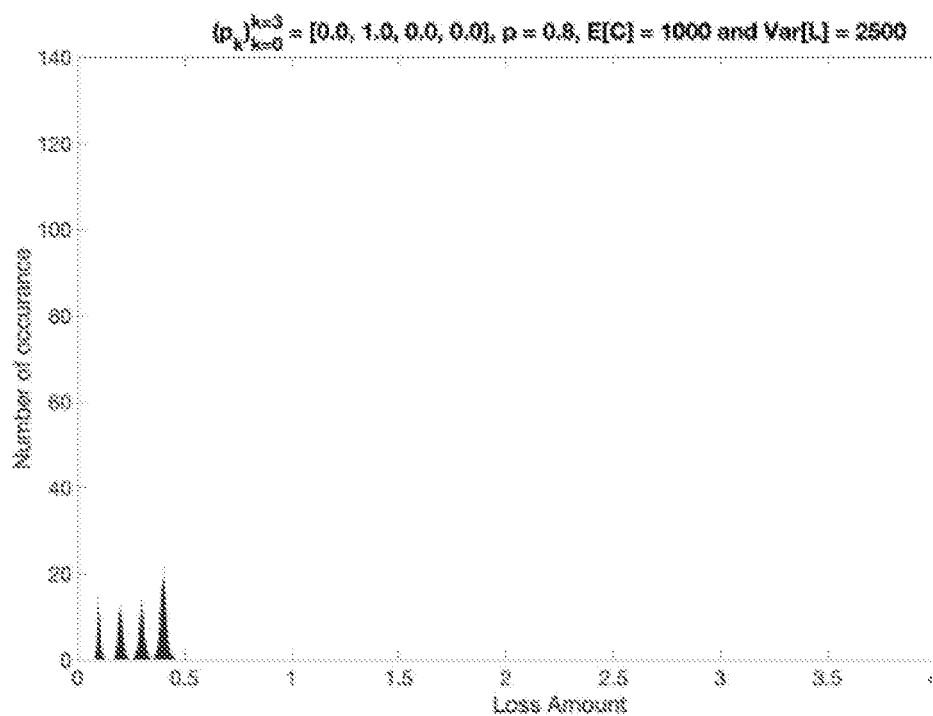
Figure 3F:
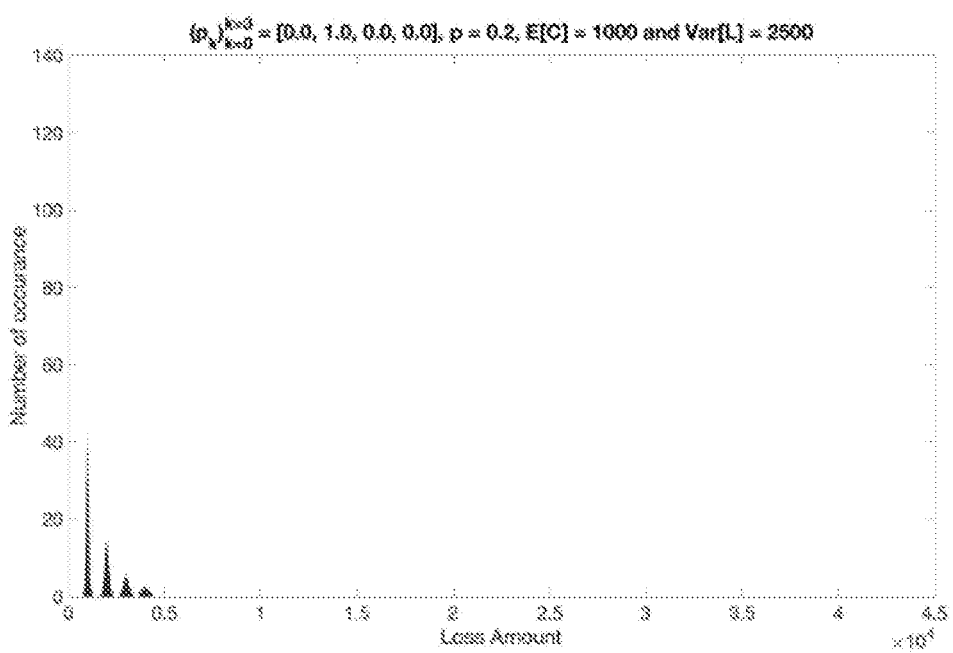
Figure 4B:
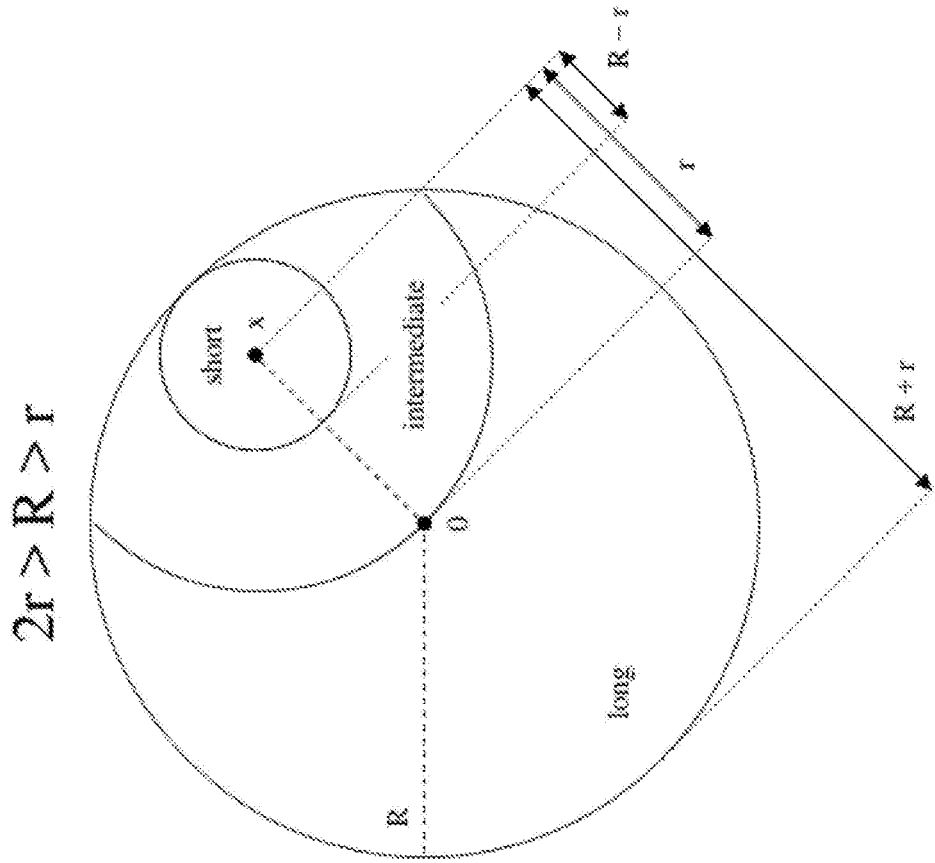
FIGS. 4A-4B are illustrations showing how to count the number of self-avoiding paths when $0<2r<R$ on the left in FIG. 4A, and how to count the number of self-avoiding paths when $2r>R>r$ on the right in FIG. 4B.
Figure 4A:
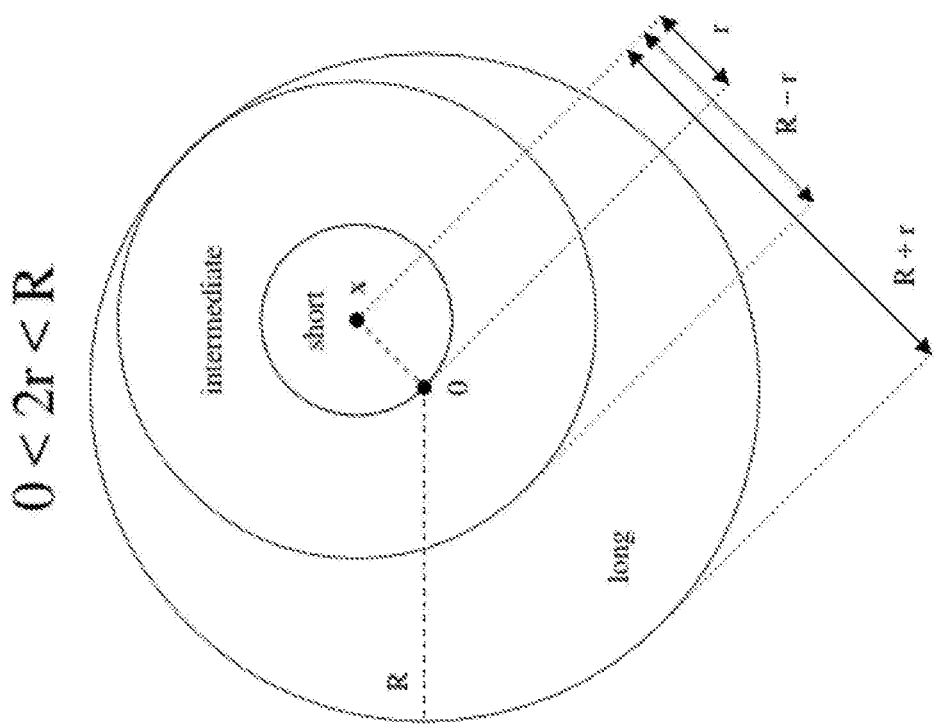

A computer-implemented framework or platform including associated methods for implementing a structural model of aggregate loss distribution for cyber risk is disclosed. In some embodiments, the structural model is formulated and implemented under the assumption of a tree-based LAN topology. In general, the problem of aggregate loss distribution may be contextualized in a probabilistic graph-theoretical framework using at least one percolation model. It may be assumed that the information technology (IT) network topology is represented by an appropriate random graph of finite or infinite size, allowing for heterogeneous loss topology, and providing instructive numerical examples.

Introduction and Technical Need/Challenges for Modeling Cyber Risk

Cyber risk due to breach can be seen as a risk of a financial loss due to breach of an institution's IT infrastructure by unauthorized parties and exploiting, taking possession of, or disclosing data assets, thus creating financial and/or reputation damage. In the case of cyber insurance, loss distributions of sufficient quality are lacking. In the academic literature so far, research in cyber risk relevant for actuarial science encompasses the application of various statistical methodologies on limited data sources. The data sources used in known studies suffer from a lack of granularity due to the underreporting of cyber-risk-relevant incidents and their types across various industries and sectors. Moreover, there is insufficient information about the losses caused by each of the reported attacks and, therefore, the connection between the number of breaches and the losses must be imputed ex-post. Some works look at cyber risk through the lenses of insurance economics and do not consider questions of loss distributions and pricing.

It is believed that any existing loss distribution models are inadequate largely due to choice of various processes such that the resulting analytical and computational complexity of these models precludes the direct use of in the context of medium sized companies or networks having for example more than fifty computers/vertices. In addition, these existing models often require mean-field approximations under very specific parameter choices, where curing rates are higher than infection rates, and demand higher-order approximations for a higher number of computers, resulting in an increasing computational burden. For all of these reasons, these models lend poorly to realities of medium to large computer networks. Moreover, it is believed that no theoretical models of an aggregate loss distribution for cyber risk exist in this setting, as further described herein.

Proposed Technical Improvement

Aspects of the present disclosure relate to implementation of a dynamical structural percolation model 101 (percolation model 101), that may be implemented via at least one computing device, and models the loss distribution for cyber risk due to breach of IT networks of a single small or medium-sized enterprise, which is believed to be a technical improvement responsive to the foregoing issues and challenges with known risk/loss distribution models. By way of further introduction, recall that a network that connects computers and other devices in a relatively small area, such as an office building, is called a Local Area Network (LAN). For a given LAN, the logical topology describes the arrangement of the devices on the LAN and the way in which they communicate with one another, whereas its physical topology refers to the geometric arrangement of the devices on the LAN network, such as computers, cables and other devices. Simply put, the logical layer of a LAN represents the arrangement of devices as data flowing through the network would perceive it, whereas the physical layer of a LAN is the arrangement in physical space of the computers, cables and other devices, in a way in which a human being would see it. The physical topology of a network can be of various types: bus, star, ring, circular, mesh, tree, hybrid, or daisy chain. Today, most networks are, in fact, of the hybrid type, that is, they are represented by a combination of several network types.

The ever-changing landscape of cyber risk threats across multiple sublayers of the logical network, such as the operating system and the applications layer, makes the modeling of various types of threats on the logical layer a mathematically daunting task subject at the whim of technological progress. Thus, the novel model described herein considers the physical layer of the LAN and assumes a tree network topology, as a composition of the star and bus networks, due to its scaling property and convenience for small and medium-sized enterprises. In addition, bond percolation may be used to introduce contagion process into the physical layer. By choosing bond percolation as a model of contagion, a view is taken which is believed to be relevant for actuaries and is consistent with actuarial modeling practice. For example, when considering loss due to fire damage, there is usually no need to model the fire process and the reaction by firefighters. Similarly, when considering losses due to mortality, actuaries do not model in detail the processes which led to the deaths of individuals or the medical counter-action. When transposed to the setting presented with the percolation model 101, this means that the burden placed on the contagion process is to reveal the computers on which losses due to breach have occurred, and not necessarily the reality of the struggles of IT staff to contain this process or the full reality of the process itself. To model the temporal dynamics of the network, that is, the fact that the network changes over time, random tree graphs may be used with the percolation model 101 as an underlying mathematical structure. It may also be assumed that an arrangement of data assets exists and that it follows the topology of the network, i.e., a data asset may be attached with a certain value to each node of the network. This arrangement in space of data asset values constitutes a cost topology. The infection of a node in the network entails the loss of the data asset and its value. To account for the dynamical nature of data assets across time and over the evolving network, it is assumed that data asset values are represented by random variables. The percolation model 101 then defines contagion process stemming from an event of a breach of a node given a particular temporal instance of network topology. Finally, the sum of all losses, given a particular node at which the infection starts and the realization of the associated contagion process, characterizes one observation point in the aggregate loss distribution due to breach.

Further within the present disclosure, analytical results are given related to the mean, variance, and tail behavior of aggregate losses resulting from cyber attacks due to breach. It is then emphasized that the analytical and numerical results hold for arbitrarily large random trees, however, since exclusively tree based LAN topology is not typically observable in big companies, the results are mostly applicable to small to medium-sized companies, thus to the dominant form of companies in an economy. Finally, the analytical results provided give an exact expression of the expectation of aggregate losses of cyber risk due to breach for the model itself, not just an approximation of the percolation model 101, and hold for all possible parameters (all possible infection rates and all possible number of computers), thus not just a subset of the parameters.

In contrast to the foregoing existing models, the percolation model 101 is taken from a substantially different conceptual view, starting from the way one perceives or looks at the computer network, and extending to the choice of modeling the contagion process and the costs that occur due to contagion. Various other advantages are further realized. Referring to FIG. 1, a system 100 is shown that may be used to implement the percolation model 101 described herein. In particular, aspects of the percolation model 101 may take the form of (or otherwise be implemented as) an application 102 implemented by at least one computing device 104, which may be a server, a computing system, or implemented as part of a cloud-computing environment. Using the application 102, the computing device 104 may be configured to execute or otherwise perform operations defined by the percolation model 101 and further described herein. In other words, functions or services provided by the model 101 and/or the application 102 may be implemented as code and/or machine-executable instructions executable by the computing device 104 that may represent one or more of a procedure, a function, a subprogram, a program, a routine, a subroutine, a module, a software package, a class, or any combination of instructions, data structures, or program statements, and the like. As such, embodiments of the application 102 and the model 101 described herein may be implemented by hardware, software, firmware, middleware, microcode, hardware description languages, or any combination thereof. When implemented in software, firmware, middleware, or microcode, the program code or code segments to perform the necessary tasks (e.g., a computer-program product) may be stored in a computer-readable or machine-readable medium, and a processor(s) associated with the computing device 104 may perform the tasks defined by the code.

As shown, the system 100 may further include a network topology 112 associated with a plurality of devices 114 (designated device 114A, device 114B, and device 114C) or nodes, any of which may be computing devices such as laptops or tablets, servers, and/or may include mobile devices such as smartphones, and the like. The topology 112 may be a LAN topology associated with a single small or medium-sized enterprise, and the percolation model 101 may be implemented to model the loss distribution for cyber risk due to breach of a network associated with the topology 112. As indicated, the computing device 104 may access data 116 associated with the topology 112 through any one of the devices 114 or other means.

As further shown, the system 100 may also include a client application 120 which may be configured to provide aspects of the percolation model 101 to any number of client devices 122 via a network 124, such as the Internet, a local area network, a cloud, and the like. In addition, data about network topologies, threats, or other related areas including metadata, and other forms of data may be stored within a database 130 accessible by the computing device 104.

Stochastic Modeling of Cyber Attacks

The mathematical framework of the percolation model 101 shall now be described to define or model loss due to cyber attacks. We introduce, and study both analytically and numerically, a stochastic model ($L_t$) that keeps track of the aggregate loss up to time t due to cyber attacks. For the purpose of pricing, the goal is to study the mean and variance of $L_t$. Intuitively, the process ($L_t$) is a continuous-time Markov chain obtained from the combination of a Poisson process representing the times at which cyber attacks strike, a random graph representing the infrastructure network of the company at the time of the attack, and a percolation process on the random graph modeling contagion. More precisely, the process can be constructed using the following components:

A Poisson process ($N_t$) with intensity $\lambda$.
A random tree $\mathbb{T}_R = (V, E)$ constructed recursively in R steps (representing the radius) from an integer-valued random variable X with probability mass function $P(X=k)=p_k$.
The global vulnerability of the network $p \in (0, 1)$.
A collection of local costs $C_y > 0$ attached to each vertex y of the random tree.
The Process Evolves as Follows. At the Arrival Times $$T^i = \inf\{t : N_t = i\}$$

of the Poisson process, we let $\mathbb{T}^i_R = (V^i, E^i)$ be a realization of the random tree that we think of as the infrastructure network of the company at time $T^i$. To construct the tree, we draw X edges starting from a root called 0, meaning k edges with probability $p_k$, and additional edges starting from each of the subsequent vertices using the same probability distribution. The construction stops after R steps so the tree has radius at most R. The trees generated at different times $$\mathbb{T}^1_R = (V^1, E^1), \mathbb{T}^2_R = (V^2, E^2), \ldots, \mathbb{T}^i_R = (V^i, E^i), \ldots$$

are independent and identically distributed. To model contagion on the ith tree, we let $x^i \in V^i$ be a vertex chosen uniformly at random from the vertex set representing the starting point of the cyber attack, and define a bond percolation process on the tree by letting $$\xi i(e) = \text{Bernoulli}(p) \text{ for all } e \in E^i$$

be independent Bernoulli random variables. Following the usual terminology of percolation theory, edges with $\xi i(e)=1$ are said to be open, and we assume that the ith cyber attack results in all the vertices in the open cluster starting at $x^i$, $$\mathscr{C}^i(x^i) = \{y \in V_i : \text{there is a path of open edges connecting } x^i \text{ and } y\},$$

to be hacked. Then, letting for $C_y^i$ for $y \in V^i$ be independent and identically distributed random variables representing the cost of each vertex, we define the size of the cyber attack $S^i$ and the global loss $C^i$ caused by the cyber attack as the number of vertices being hacked and the cumulative cost of all the vertices being hacked, respectively:

$$S^i = \text{card}(\mathscr{C}^i(x^i)) \text{ and } C^i = \sum_{y \in \mathscr{C}^i(x^i)} C_y^i.$$

Finally, the random variable $L_t$ is defined as the aggregate loss caused by all the cyber attacks that occurred until time t. In equation, $$L_t = \sum_{i=1}^{N_t} C^i = \sum_{i=1}^{N_t} \sum_{y \in \mathscr{C}^i(x^i)} C_y^i.$$

As previously mentioned, the frequent demand of insurance pricing is to compute the mean and the variance of $L_t$ (see [14] or [20]). Note that, because the random trees, percolation processes on those tree, and local costs on the vertices are independent and identically distributed for different cyber attacks, by conditioning on the number of attacks $N_t$ until time t, we get $$E(L_t | N_t = n) = E(C^1 + \ldots + C^{N_t} | N_t = n) = nE(C^1)$$

$$\text{Var}(L_t | N_t = n) = \text{Var}(C^1 + \ldots + C^{N_t} | N_t = n) = n \text{Var}(C^1)$$

The first equation implies that $$E(L_t) = E(E(L_t | N_t)) = E(N_t E(C^1)) = E(N_t)E(C^1) = \lambda t E(C^1) \quad (1)$$

and while using also the second equation and the law of total variance, we get $$\text{Var}(L_t) = E(\text{Var}(L_t | N_t)) + \text{Var}(E(L_t | N_t)) \quad (2)$$

$$= E(N_t \text{Var}(C^1)) + \text{Var}(N_t E(C^1)) = E(N_t)\text{Var}(C^1) + \text{Var}(N_t)(E(C^1))^2.$$

Equations (1) and (2) show that the mean and variance of the total loss up to time t can be easily expressed using the mean and variance of the cost of one cyber attack. Therefore, we now focus on the cost of a single attack, and drop all the superscripts i referring to the number of the attack to avoid cumbersome notations.

Remark 1—Consider a scenario where, for a given (realization of a random) tree, instead of assuming that all nodes contain unique data, there exist at least two nodes x and y that share data of value $C_{xy}$. Our model assumes that the two vertices being hacked results in a loss of $C_x+C_y$ whereas the actual loss when data are shared is just $C_x+C_y-C_{xy}$. In particular, our model gives an upper bound for the loss over all the cases where data are shared among nodes.

Analytical Results

Recall that the number of edges starting from each vertex moving away from the root is described by the random variable X with probability mass function $(p_k)_{k=0}^\infty$. To state our result, we let $$\mu = E(X) = \sum_{k=0}^{\infty} k p_k \text{ and } \sigma^2 = \text{Var}(X) = \sum_{k=0}^{\infty} (k-\mu)^2 p_k$$

be the mean and the variance of X. Throughout this paper, probabilities, expected values and variances with the subscript r denote their conditional counterparts given that the cyber attack starts from a vertex located at distance r from the root. To begin with, we study the process when the attack starts from the root, meaning that r=0. In this case, the number of vertices being hacked is related to the number of individuals in a branching process. The analysis is simplified and the mean and variance of the total cost can be computed explicitly due to spherical symmetry, and conveniently expressed using the mean and variance $\mu$ and $\sigma^2$ introduced above.

Theorem 2—For an attack starting at the root, $E_0(C)=E_0(S)E(C_0)$ and $\text{Var}_0(C)=E_0(S)\text{Var}(C_0)+\text{Var}_0(S)(E(C_0))^2$ where the mean and variance of S are given by:

$$E_0(S) = \frac{1-(\mu p)^{R+1}}{1-\mu p}$$

$$\text{Var}_0(S) = \frac{p(1-p)\mu + p^2 \sigma^2}{(1-\mu p)^2}\left(\frac{1-(\mu p)^{2R+1}}{1-\mu p} - (2R+1)(\mu p)^R\right).$$

It follows from the theorem that the expected cost is infinite on the limiting tree obtained by taking the limit as $R \to \infty$ when $\mu p>1$. In fact, not only the expected cost is infinite but also there is a positive probability that the cost is infinite. This probability can be expressed implicitly using the probability generating function $\phi(\theta)=E(\theta^Y)$ of the random variable $Y=Y_1+Y_2+\ldots+Y_X$ where the $Y_i$ are independent Bernoulli random variables with parameter p. This probability is also related to what we shall call the radius $R_0$ of a cyber attack starting at the root:

$R_0=\max\{d(0,y): y \in \mathscr{C}(0)\},$ the maximum graph distance (number of edges) from the root among all vertices that are being hacked. The next result states that the radius of an attack decays exponentially when $\mu p<1$ whereas the attack reaches the leaves of the random tree with a positive probability that does not depend on the size of the tree when $\mu p>1$.

Theorem 3 (tail behavior)—For an attack starting at the root,

When $\mu p<1$, we have exponential decay: $P_0(R_0 \geq n) \leq (\mu p)^n$.

When $\mu p>1$, the function $\phi$ has a unique fixed point $\theta_\infty \in (0,1)$ and $P_0(R_0=R) \geq 1-\theta_\infty > 0$ for all $R>0$.

The expected value, variance and tail distribution are much more difficult to study when the cyber attack does not start from the root. However, we were able to compute explicitly the expected value for all $r \leq R$ using combinatorial techniques to count the number of self-avoiding paths of a given length starting from the origin of the attack. To state our results, we let $$\bar{\mu} = E(X-1 | X \neq 0) = \frac{\mu}{1-p_0} - 1.$$

Theorem 4 (mean)—Let R be even. Then $E_r(C)=E_r(S)E(C_0)$ where $$E_r(S) = \frac{1}{1-\mu p}\left(1 + \frac{p(1-p^r)(1-(\mu-\bar{\mu})p)}{1-p} - \frac{(\mu p)^{R-r+1}(1-p^2(\mu-\bar{\mu}(1-(\mu p^2)^r)))}{1-\mu p^2}\right) \quad (3)$$

for all $0 \leq r \leq R$.

Even though it is not obvious from the theorem, it can be proved (and it is intuitively clear) that the expected cost is increasing with respect to the radius R. Indeed, $1-\mu p^2>0$ if and only if $1-(\mu p^2)^r>0$ if and only if $1-p^2(\mu-\bar{\mu}(1-(\mu p^2)^r))>1-\mu p^2$ which, together with the fact that $1-\mu p>0$ if and only if $\mu p<1$ if and only if $R \mapsto -(\mu p)^{R-r+1}$ is increasing.

implies that the expression $\varphi_r(R)$ on the right-hand side of (3) is increasing in R. The assumption R even is purely technical, but the proof of the theorem (see Lemma 11 below) shows that the expected cost is globally increasing with respect to R. In particular, the expected cost for R odd can be bounded from below and from above using the theorem and the fact that $\phi_r(R-1)<E_r(S)<\phi_r(R+1)$ for all $0 \leq r \leq R$.

Another consequence of Lemma 11 that is again intuitively obvious is that, everything else being fixed, the expected cost of a cyber attack is increasing with respect to p. The expected cost, however, is not monotone with respect to the distance r. For instance, when the network is the deterministic regular tree with degree d, at least for small values of p, the expected cost first increases while moving away from the root but then decreases while moving closer to the leaves (see Table 2 below). The variance of the cost caused by an attack starting at vertex $x \neq 0$ is much more difficult to compute. However, a simple qualitative argument gives the following upper bound.

Theorem 5 (variance)—For all $r \leq R$, $\text{Var}_r(C) \leq E_r(S)\text{Var}(C_0)+(p^{-2R}-1)(E_r(S)E(C_0))^2.$ Our theorems only give conditional mean and variance given that the cyber attack starts at a certain distance from the root. These results, however, can be used to study the unconditional mean and variance that appear in (1) and (2) for deterministic trees with X=d where each vertex has degree d+1, except for the root that has degree d and for the leaves that have degree one. For this particular graph, applying Theorems 4 and 5 gives the following corollary.

Corollary 6 (regular tree)—For the regular tree with X=d, $$E(C) = \left(\frac{1-d}{1-d^{R+1}}\right) \sum_{r=0}^{R} d^r E_r(S) E(C_0)$$

$$\text{Var}(C) \leq \left(\frac{1-d}{1-d^{R+1}}\right) \left(\sum_{r=0}^{R} d^r E_r(S) \text{Var}(C_0) + \right.$$

$$\left. \left(\sum_{r=0}^{R} d^r p^{-2R} (E_r(S))^2 - \left(\frac{1-d}{1-d^{R+1}}\right) \sum_{r,s} d^{r+s} E_r(S) E_s(S)\right) (E(C_0))^2\right)$$

where the conditional expected size is given by $$E_r(S) = \left(\frac{1}{1-dp}\right) \left(1 + p(1-p^r) - \frac{(dp)^{R-r+1}(1 - p^2(1 + (d-1)(dp^2)^r))}{1-dp^2}\right).$$

Looking at the tail distribution, for the regular tree, the random variable Y is the sum of X=d independent Bernoulli random variables with parameter p so it is binomial and we get $$\phi(\theta) = E(\theta^Y) = \sum_{k=0}^{\infty} \theta^k P(Y=k) = \sum_{k=0}^{d} \binom{d}{k} p^k (1-p)^{d-k} \theta^k = (1-p+p\theta)^d.$$

For instance, for the binary tree with d=2, we have $$\phi(\theta) - \theta = (1-p+p\theta)^2 - \theta =$$
$$p^2\theta^2 - (p^2 + (1-p)^2)\theta + (p-1)^2 = p^2(\theta-1)(\theta - (1-1/p)^2)$$

showing that, for an attack starting at the root of the infinite binary tree, $$P_0(R_0 = R) \geq 1 - \left(1 - \frac{1}{p}\right)^2 \text{ when } p > \frac{1}{2}$$

while $P_0(R_0 \geq n) \leq (2p)^n$ when $p < \frac{1}{2}$, according to Theorem 3.

Numerical Results

For numerical example, we perform pricing (P) of cyber risk insurance under the assumptions of the developed model, i.e., given a small or medium-sized enterprise with a tree based LAN topology. To that aim, we consider actuarial fair premium: $P=E(L)$ expectation principle: $P=E(L)+\delta E(L)$ standard deviation principle: $p=E(L)+\delta\sqrt{\text{var}(L)}$ semi-variance principle: $P=E(L)+\delta E((L-E(L))^+)^2$ as pricing principles. We keep parameter $\delta$=0.1. Without loss of generality, we assume $\lambda$=1, thus the attacks occur at rate one per unit of time. In practice, to choose the rate of attacks $\lambda$, an insurance company should petition its cyber risk due to breach policyholders for information about the average number of attacks per unit of time.

Three choices of probability mass function [$p_0, p_1, p_2, p_3$] for random tree edge formation are considered. The tree with probabilistic formation of edges under consideration was characterized by the probability mass function [0.0, 0.1, 0.3, 0.6]. Hence, for each vertex, the probability of zero offspring $p_0$ with this choice is made to be zero. The probability of one offspring is $p_1$=0.1, the probability of two offspring is $p_2$=0.3, and the probability of three offspring is $p_3$=0.6. The deterministic tree characterized by the probability mass function of edge formation [0, 0, 0, 1], in number of vertices, dominates the above chosen tree with probabilistic formation of edges, given the same radius R. Across all experiments the radius of trees is chosen to be four. Also, given the same radius, the chosen probabilistic tree, in terms of number of vertices, dominates the deterministic trees characterized by the probability mass function of edge formation [0, 1, 0, 0].

We allow for four types of distribution of cost C due to breach: deterministic, Bernoulli distribution, log-normal distribution both with high and low variance and normal distribution with low variance. The choice of expectation of cost E(C) was stylized, kept to 1000 monetary units, and made consistent across all cost distributions. The standard deviation of cost $\sqrt{\text{Var}(C)}$ is allowed to change across distributions such that grows from 0 for deterministic case, to approximately 284 for Bernoulli distributed cost and is either 50 or 500 for log-normally distributed cost. The normal distribution, due to its support being the entire real line, for theoretical reasons, is not an appropriate choice for the distribution of costs. Nevertheless, for purposes of comparing the impact of choice of distribution on pricing, we consider it and choose its standard deviation to be 50. Finally, two cases of probability of edge contagions were considered: low probability of edge contagion characterized by p=0.2 and high probability of edge contagion characterized by p=0.8. In practice, to choose the probability of the edge contagion p, an insurance company may perform risk classification by clustering their portfolio of cyber risk due to breach policyholders according to their adherence to a particular cyber risk management methodology. Regretfully, in practice, an exact value of p is unknowable. Thus, for risk classes, according to their riskiness, and based on its judgment, an actuary should impute values of edge contagion Within this experiment setting, to calculate the cyber risk insurance premiums, we perform one million simulations. Our unreported experiments confirm that the number of simulations performed is sufficient to achieve prices stability and the desired accuracy.

There are several findings that can be derived from numerical results presented in Table 1 herein. First, for a fixed probability of edge contagion, the premium under the actuarial fair principle is consistently higher for the deterministic tree with $p_3$=1.0 than for the tree with probabilistic edge formation. Conversely, the premium under the actuarial fair principle is consistently lower for the deterministic tree with $p_1$=1.0 than for the tree with probabilistic edge formation. This is also true for premiums based on expectations principle. Second, given standard deviation principle and for a fixed probability of edge contagion and a fixed tree type, keeping the same expectation of cost, as variance increases across cost probability distributions under consideration, the premiums increase. This is also true for premiums calculated based on semi-variance principle. Third, given any probability distribution of costs, for the same maximum radius and the same probability of edge contagion, the tree edge formation probability mass function has impact on prices such that trees with higher average number of vertices yield higher premiums. Fourth, comparing the prices based on semi-variance principle between log-normally and normally distributed costs with same mean and variance, we conclude that the choice of cost distribution (not just its mean and variance) has an impact on prices.

Looking at the examples of distributions of loss due to breach in FIGS. 2A-2F and 3A-3F, we observe that these distributions loosely follow log-normal patterns and exhibit multi-modality for lower probability of edge contagion. Interestingly, the log-normal pattern observed in our structural model might serve as theoretical underpinning of empirical findings for loss distributions based on data sets under their consideration. Unlike the loss distribution in FIGS. 2A-3F, accounting for the case of high volatility cost that has the continuous interval for support, the loss distribution in FIGS. 3A-3F shows support emerging as union of continuous subintervals. Unreported graphs of loss distributions due to breach, under the assumption of deterministic cost as well as Bernoulli distributed cost, present similar patterns of log-normal shape with multi-modalities. However, for deterministic and Bernoulli distributed costs, loss distributions due to breach have only discrete support.

For a comparison between the analytical results in Theorem 4 and simulation based results, we refer to Table 2 below. The table displays the analytical versus simulated values of the conditional expected size of a cyber attack given that the attack starts at level r. There, a deterministic tree with three offspring d=3, i.e., with probability mass function [0, 0, 0, 1], having four levels R=4 was assumed. The two probabilities of edge contagion are considered: p=0.2 and p=0.8. The simulation results are based on one million independent realizations. The table shows an almost perfect match between the analytical and simulation results. We also note that unreported experiments reveal that an increase in the number of simulations further reduces the difference between analytical and simulation results, in agreement with the strong law of large numbers.

In the present disclosure, as a main theoretical contribution to existing actuarial literature, we develop a dynamic structural percolation model of loss distribution for cyber risk of small or medium-sized enterprises with tree based LAN topology. Specifically, by focusing on the physical layer of LAN topology, by imposing simple contagion process on network based on percolation theory, and by introducing the topology of costs, we make the three major conceptual insights of this work. Based on them, we robustly reduce the complexity of cyber risk phenomena and allow for an effective modeling and pricing. From modeling standpoint, we allow for dynamic nature of LAN topology, as well as temporal uncertainty of costs due to data breach. Within a rigorous mathematical framework through probabilistic and combinatorial analysis, we characterize the main aspects of loss distribution due to breaches. With the appropriate numerical experiments, we credibly demonstrate the practical aspect of this research reflected in a cyber risk due to breach pricing methodology. Because cyber risk represents a significant emerging opportunity for insurers, the pricing of this new type of risk proposed in this paper can prove to be of considerable value.

TABLE 1

The prices of cyber risk due to breach based on Actuarial Fair Premium, Expectation Principle, Standard Deviation Principle and Semi-Variance Principle. The Deterministic, Bernoulli, Log-normally and Normally distributed costs are considered given three probability mass functions for random tree formation and two probabilities of edge contagion. The pricing is based on one million simulations where $\delta = 0.1$.

| | | | Premium Type | | | |
| --- | --- | --- | --- | --- | --- | --- |
| Cost Distribution | [p0, p1, p2, p3] | p | Actuarial Fair Premium Principle $E[L]$ | Expectation Principle $E[L] + \delta E[L]$ | Standard Deviation Principle $E[L] + \delta\sqrt{Var[L]}$ | Semi Variance Principle $E[L] + \delta E[(L - E[L])^+]^2$ |
| Deterministic | [0.0, 0.0, 0.0, 1.0] | 0.2 | 1,595.38 | 1,754.91 | 1,706.47 | 17,787.03 |
| P[C = 1000] = 1 | [0.0, 0.1, 0.3, 0.6] | 0.2 | 1,553.99 | 1,709.39 | 1,655.12 | 15,602.43 |
| E[C] = 1000 | [0.0, 1.0, 0.0, 0.0] | 0.2 | 1,344.39 | 1,478.83 | 1,405.26 | 7,489.87 |
| $\sqrt{Var[C]} = 0$ | [0.0, 0.0, 0.0, 1.0] | 0.8 | 16,655.50 | 18,321.04 | 17,820.24 | 2,782,446.38 |
| | [0.0, 0.1, 0.3, 0.6] | 0.8 | 11,684.72 | 12,853.19 | 12,511.66 | 1,263,035.38 |
| | [0.0, 1.0, 0.0, 0.0] | 0.8 | 3,096.98 | 3,406.68 | 3,204.55 | 24,481.95 |
| Bernoulli | [0.0, 0.0, 0.0, 1.0] | 0.2 | 1,596.17 | 1,755.79 | 1,718.31 | 19,694.42 |
| P[C = 5,000.00] = 0.01 | [0.0, 0.1, 0.3, 0.6] | 0.2 | 1,554.82 | 1,710.30 | 1,667.97 | 17,445.23 |
| P[C = 959.60] = 0.99 | [0.0, 1.0, 0.0, 0.0] | 0.2 | 1,345.49 | 1,480.04 | 1,422.23 | 8,892.72 |
| E[C] ≈ 1000 | [0.0, 0.0, 0.0, 1.0] | 0.8 | 16,659.74 | 18,325.71 | 17,836.73 | 2,802,110.94 |
| $\sqrt{Var[C]} \approx 284$ | [0.0, 0.1, 0.3, 0.6] | 0.8 | 11,689.78 | 12,858.76 | 12,528.26 | 1,284,190.50 |
| | [0.0, 1.0, 0.0, 0.0] | 0.8 | 3,094.22 | 3,403.65 | 3,222.74 | 27,766.60 |
| Log-normal | [0.0, 0.0, 0.0, 1.0] | 0.2 | 1,596.18 | 1,755.80 | 1,724.09 | 22,078.89 |
| E[C] = 1000 | [0.0, 0.1, 0.3, 0.6] | 0.2 | 1,553.20 | 1,708.52 | 1,671.82 | 19,709.60 |
| $\sqrt{Var[C]} = 500$ | [0.0, 1.0, 0.0, 0.0] | 0.2 | 1,344.41 | 1,478.85 | 1,428.50 | 11,470.20 |
| | [0.0, 0.0, 0.0, 1.0] | 0.8 | 16,652.75 | 18,318.02 | 17,835.26 | 2,814,229.56 |
| | [0.0, 0.1, 0.3, 0.6] | 0.8 | 11,687.73 | 12,856.51 | 12,532.14 | 1,299,585.20 |
| | [0.0, 1.0, 0.0, 0.0] | 0.8 | 3,094.18 | 3,403.60 | 3,233.21 | 34,470.74 |

TABLE 1-continued

The prices of cyber risk due to breach based on Actuarial Fair Premium, Expectation Principle, Standard Deviation Principle and Semi-Variance Principle. The Deterministic, Bernoulli, Log-normally and Normally distributed costs are considered given three probability mass functions for random tree formation and two probabilities of edge contagion. The pricing is based on one million simulations where $\delta = 0.1$.

| | | | Premium Type | | | |
|---|---|---|---|---|---|---|
| Cost Distribution | [p0, p1, p2, p3] | p | Actuarial Fair Premium Principle $E[L]$ | Expectation Principle $E[L] + \delta E[L]$ | Standard Deviation Principle $E[L] + \delta\sqrt{Var[L]}$ | Semi Variance Principle $E[L] + \delta E[(L - E[L])^+]^2$ |
| Log-normal | [0.0, 0.0, 0.0, 1.0] | 0.2 | 1,597.25 | 1,756.97 | 1,708.93 | 17,876.39 |
| $E[C] = 1000$ | [0.0, 0.1, 0.3, 0.6] | 0.2 | 1,555.11 | 1,710.62 | 1,656.51 | 15,638.29 |
| $\sqrt{Var[C]} = 50$ | [0.0, 1.0, 0.0, 0.0] | 0.2 | 1,343.55 | 1,477.90 | 1,404.64 | 7,470.12 |
| | [0.0, 0.0, 0.0, 1.0] | 0.8 | 16,660.19 | 18,326.20 | 17,825.25 | 2,783,400.15 |
| | [0.0, 0.1, 0.3, 0.6] | 0.8 | 11,703.76 | 12,874.14 | 12,530.80 | 1,261,778.29 |
| | [0.0, 1.0, 0.0, 0.0] | 0.8 | 3,095.74 | 3,405.32 | 3,203.78 | 24,632.38 |
| Normal | [0.0, 0.0, 0.0, 1.0] | 0.2 | 1,595.35 | 1,754.88 | 1,706.93 | 17,810.30 |
| $E[C] = 1000$ | [0.0, 0.1, 0.3, 0.6] | 0.2 | 1,503.81 | 1,709.12 | 1,655.24 | 15,612.43 |
| $\sqrt{Var[C]} = 50$ | [0.0, 1.0, 0.0, 0.0] | 0.2 | 1,344.25 | 1,478.68 | 1,405.41 | 7,488.77 |
| | [0.0, 0.0, 0.0, 1.0] | 0.8 | 16,629.39 | 18,292.33 | 17,795.39 | 2,789,773.43 |
| | [0.0, 0.1, 0.3, 0.6] | 0.8 | 11,686.85 | 12,855.53 | 12,513.20 | 1,260,716.39 |
| | [0.0, 1.0, 0.0, 0.0] | 0.8 | 3,097.32 | 3,407.05 | 3,205.29 | 24,610.16 |

There are ample opportunities for further research following this work. Two most prominent are: cyber risk loss modeling in a general LAN topology as well as risk management of cyber risk liabilities for a diversified portfolio of insurance policies written on companies across multiple industries and sectors in general economy.

TABLE 2

The analytical versus simulated values of the expected size of cyber attack due to breach $E_r(S)$ given level $r$ are presented. A deterministic tree (d = 3) having four levels (R = 4) was assumed.
$E_r(S)$ assuming $[p_0, p_1, p_2, p_3] = [0, 0, 0, 1]$

| | p = 0.2 | | p = 0.8 | |
|---|---|---|---|---|
| r | Analytical | Simulated | Analytical | Simulated |
| 0 | 2.177552 | 2.176000 | 22.976907 | 22.984000 |
| 1 | 2.315189 | 2.316800 | 21.681858 | 21.684800 |
| 2 | 2.001532 | 1.999360 | 18.561597 | 18.571840 |
| 3 | 1.360507 | 1.359872 | 15.208322 | 15.217472 |

Proof of Theorem 2

The first ingredient to prove Theorem 2 is to observe that, when the cyber attack starts at the root of the random tree, the number of vertices being hacked is related to the number of individuals in a certain branching process. Indeed, let $X_n$ be the number of vertices at distance n from the root being hacked. Because the number of edges starting from each vertex and moving away from the root is described by X and that these edges are independently open with probability p, $$X_{n+1} = Y_{n,1} + Y_{n,2} + \ldots + Y_{n,X_n} \quad (4)$$

where the random variables $Y_{n,i}$ are independent and equal in distribution to the sum of X independent Bernoulli random variables with parameter p. This implies that $(X_n)$ is the branching process with offspring distribution Y. In particular, the expected value and variance of the global cost C can be conveniently written using the expected value and variance of the offspring distribution, so we start by computing these two quantities in the following lemma.

Lemma 7—Recalling that $\mu = E(X)$ and $\sigma^2 = Var(X)$, we have $$\nu = E(Y) = \mu p \text{ and } \Sigma^2 = Var(Y) = p(1-p)\mu + p^2\sigma^2.$$

Proof. Using that the random variable Y is defined as the sum of X independent Bernoulli random variables $Y_i$ with parameter p, and conditioning on X, we get $$E(Y|X) = E(Y_1 + \ldots + Y_X|X) = XE(Y_i) = pX$$

$$Var(Y|X) = Var(Y_1 + \ldots + Y_X|X) = X\,Var(Y_i) = p(1-p)X. \quad (5)$$

Taking the expected value in the first line of (5) gives $$\Sigma^2 = Var(Y) = E(Var(Y|X)) + Var(E(Y|X)) = E(p(1-p)X) + Var(pX) =$$
$$p(1-p)E(X) + p^2 Var(X) = p(1-p)\mu + p^2\sigma^2.$$

This completes the proof. □

Another key to proving Theorem 2 is the fact that, because the local costs are independent and identically distributed, the expected value and variance of the global cost C can be easily expressed as a function of the expected value and variance of the size S of the attack, i.e., the number of vertices being hacked. Using also that the number of vertices being hacked is related to the branching process $(X_n)$, we can prove the following two lemmas.

Lemma 8—Assume that $G = \mathbb{T}_R$. Then, $$E_0(S) = \frac{1 - \nu^{R+1}}{1 - \nu}.$$

Proof. Recalling that $X_n$ denotes the number of vertices being hacked due to an attack starting at the root of the random tree $G = \mathbb{T}_R$, we have $$X_n = \text{card}\{y \in V : y \in C(0) \text{ and } d(0,y) = n\}$$

which, together with $S = \text{card}(C(0))$, implies that $$E_0(S) = E\left(\sum_{n=0}^{R} \text{card }\{y \in V : y \in \mathscr{C}(0) \text{ and } d(0, y) = n\}\right) = E\left(\sum_{n=0}^{R} X_n\right). \quad (6)$$

In addition, taking the expected value in (4), we get $$E(X_{n+1}) = E(E(X_{n+1}|X_n)) =$$
$$E(E(Y_{n,1} + Y_{n,2} + \ldots + Y_{n,X_n}|X_n)) = E(X_n E(Y)) = E(X_n)E(Y) = \nu E(X_n)$$

so a simple induction gives $$E(X_n) = \nu E(X_{n-1}) = \nu^2 E(X_{n-2}) = \ldots = \nu^n E(X_0) = \nu^n. \qquad (7)$$

Combining (6) and (7), we conclude that $$E_0(S) = E\left(\sum_{n=0}^{R} X_n\right) = \sum_{n=0}^{R} E(X_n) = \sum_{n=0}^{R} \nu^n = \frac{1-\nu^{R+1}}{1-\nu}.$$

This completes the proof. $\square$

Lemma 9—Assume that $G = \mathbb{T}_R$. Then, $$\mathrm{Var}_0(S) = \Sigma^2 \left( \sum_{n=0}^{R} \left( \nu^{n-1} \sum_{k=0}^{n-1} \nu^k \right) + 2 \sum_{m=1}^{R} \sum_{n=0}^{m-1} \left( \nu^{m-1} \sum_{k=0}^{n-1} \nu^k \right) \right).$$

PROOF. Using as in the proof of Lemma 8 that the size S coincides with the sum of the $X_n$ when the attack starts at the root, we obtain $$\mathrm{Var}_0(S) = \mathrm{Var}\left(\sum_{n=0}^{R} X_n\right) = \sum_{n=0}^{R} \mathrm{Var}(X_n) + 2\sum_{m=1}^{R}\sum_{n=0}^{m-1} \mathrm{cov}(X_n, X_m). \qquad (8)$$

Now, using independence, we get $$E(X_n|X_{n-1}) = E(Y_{n-1,1} + \ldots Y_{n-1,X_{n-1}}|X_{n-1}) =$$
$$X_{n-1}E(Y) = \nu X_{n-1}$$

$$\mathrm{Var}(X_n - X_{n-1}) = \mathrm{Var}(Y_{n-1,1} + \ldots + Y_{n-1,X_{n-1}}|$$
$$X_{n-1}) = X_{n-1}\mathrm{Var}(Y) = \Sigma^2 X_{n-1}$$

which, together with the law of total variance, gives $$\mathrm{Var}(X_n) = E(\mathrm{Var}(X_n|X_{n-1})) + \mathrm{Var}(E(X_n|X_{n-1})) =$$
$$E(\Sigma^2 X_{n-1}) + \mathrm{Var}(\nu X_{n-1}) = \Sigma^2 \nu^{n-1} + \nu^2 \mathrm{Var}(X_{n-1}).$$

Using a simple induction, we deduce that $$\mathrm{Var}(X_n) = \qquad (9)$$
$$\Sigma^2 \nu^{n-1} + \nu^2(\Sigma^2 \nu^{n-2} + \nu^2 \mathrm{Var}(X_{n-2})) = \Sigma^2 \nu^{n-1} + \Sigma^2 \nu^n + \nu^4 \mathrm{Var}(X_{n-2}) =$$
$$\Sigma^2 \nu^{n-1} + \Sigma^2 \nu^n + \ldots + \Sigma^2 \nu^{2n-2} + \nu^{2n}\mathrm{Var}(X_0) = \Sigma^2 \nu^{n-1} \sum_{k=0}^{n-1} \nu^k.$$

In addition, $E(X_m|X_n) = \nu^{m-n}X_n$ for all $n \leq m$ therefore $$\mathrm{cov}(X_n, X_m) = E(X_n X_m) - E(X_n)E(X_m) = E(X_n E(X_m|X_n)) - \nu^n \nu^m =$$
$$\nu^{m-n} E(X_n^2) - \nu^{n+m} = \nu^{m-n}\mathrm{Var}(X_n) + \nu^{m-n}E(X_n)^2 - \nu^{n+m} =$$
$$\nu^{m-n}\mathrm{Var}(X_n) + \nu^{m-n}\nu^{2n} - \nu^{n+m} = \nu^{m-n}\mathrm{Var}(X_n)$$

which, together with (9), gives $$\mathrm{cov}(X_n, X_m) = \Sigma^2 \nu^{m-1} \sum_{k=0}^{n-1} \nu^k \text{ for all } n \leq m. \qquad (10)$$

Combining (8)-(10), we conclude that $$\mathrm{Var}_0(S) = \Sigma^2 \left( \sum_{n=0}^{R} \left( \nu^{n-1} \sum_{k=0}^{n-1} \nu^k \right) + 2 \sum_{m=1}^{R} \sum_{n=0}^{m-1} \left( \nu^{m-1} \sum_{k=0}^{n-1} \nu^k \right) \right)$$

This completes the proof.

Computing the sums in the previous lemma explicitly, we obtain the following result whose proof is purely computational and done in the appendix.

Lemma 10—Assume that $G = \mathbb{T}_R$. Then, $$\mathrm{Var}_0(S) = \frac{\Sigma^2}{(1-\nu)^2}\left( \frac{1 - \nu^{2R+1}}{1-\nu} - (2R+1)\nu^R \right).$$

Given each realization of the random graph $G = \mathbb{T}_R$, the local costs ($C_y$) are independent and identically distributed. In addition, $$S = \mathrm{card}(\mathscr{G}(0)) \text{ and } C = \sum_{y \in \mathscr{G}(0)} C_y$$

when the attack starts at the root, therefore $$E_0(C|S) = SE(C_0) \text{ and } \mathrm{Var}_0(C|S) = S \mathrm{Var}(C_0). \qquad (11)$$

Taking the expected value in the first equation of (11), we get $$E_0(C) = E(E_0(C|S)) = E_0(SE(C_0)) = E_0(S)E(C_0) \qquad (12)$$

while using the law of total variance and (11) gives $$\mathrm{Var}_0(C) = E(\mathrm{Var}_0(C|S)) + \mathrm{Var}(E_0(C|S)) \qquad (13)$$
$$= E_0(S\mathrm{Var}(C_0)) + \mathrm{Var}_0(SE(C_0))$$
$$= E_0(S)\mathrm{Var}(C_0) + \mathrm{Var}_0(S)(E(C_0))^2.$$

In addition, combining Lemmas 7 and 8, we get $$E_0(S) = \frac{1 - \nu^{R+1}}{1-\nu} = \frac{1 - (\mu p)^{R+1}}{1 - \mu p} \qquad (14)$$

while combining Lemmas 7 and 10, we get $$\text{Var}_0(S) = \frac{\Sigma^2}{(1-v)^2}\left(\frac{1-v^{2R+1}}{1-v} - (2R+1)v^R\right) \quad (15)$$

$$= \frac{p(1-p)\mu + p^2\sigma^2}{(1-\mu p)^2}$$

$$\left(\frac{1-(\mu p)^{2R+1}}{1-\mu p} - (2R+1)(\mu p)^R\right).$$

The theorem follows from (12)-(15).

Proof of Theorem 3

The proof follows from well-known results for branching processes. Recalling that $X_n$ denotes the number of hacked vertices at distance n from the root, for all $0 \leq n < R$, $$\{R_0 = n\} = \{X_n \neq 0\} \cap \{X_{n+1} = 0\} \text{ and } \{R_0 = R\} = \{X_R \neq 0\}.$$

Recalling also from (7) that $E(X_n) = (\mu p)^n$, we deduce that $$P_0(R_0 \geq n) = P(X_n \neq 0) = \sum_{k=1}^{\infty} P(X_n = k) \leq \sum_{k=0}^{\infty} kP(X_n = k) = E(X_n) = (\mu p)^n$$

which proves exponential decay of the radius of the cyber attack when $\mu p < 1$. To deal with the supercritical case $\mu p > 1$, we simply observe that $$P_0(R_0 = R) \geq P(x_n \neq 0 \text{ for all } n > 0)$$

and that the right-hand side is the survival probability of the branching process which is known to be equal to $1 - \theta_\infty$ where $\theta_\infty$ is the unique fixed point in the open interval (0, 1) of the probability generating function $\phi$. We refer the reader to [21, Theorem 6.2] for a proof.

Proof of Theorem 4*

The proof of Theorem 4 is rather long so, before going into the details, we briefly explain the strategy and the different steps of the proof. The starting point is to observe that, because of the underlying tree structure, there is exactly one path connecting any two vertices. This implies that the probability that a given vertex y is being hacked is simply p at the power the graph distance between the original point of the attack and vertex y. In particular, to compute the expected size of the cyber attack, it suffices to count the number of self-avoiding paths of a given length n starting from a given vertex. The approach to count the number of paths starting from a vertex x at distance r from the root differs depending on r. Also, we distinguish between two cases and find different expressions for the expected size:

$$E_r(S) = \begin{cases} \phi_-(r) & \text{when } 0 < 2r < R \\ \phi_+(r) & \text{when } 2r > R > r. \end{cases}$$

See FIG. 3 for a picture of these two cases. Then, we cover the boundary cases, and show that the two expressions above extend to these particular cases:

$$E_0(S) = \phi_-(0), \quad E_{R/2}(S) = \phi_-(R/2), \quad E_R(S) = \phi_+(R).$$

The last step to complete the proof of the theorem is purely computational and consists in proving that the two expressions above in fact coincide and that, for all $0 \leq r \leq R$, $$\phi_-(r) = \phi_+(r) = \frac{1}{1-\mu p}$$

$$\left(1 + \frac{p(1-p^r)(1-(\mu-\tilde{\mu})p)}{1-p} - \frac{(\mu p)^{R-r+1}(1-p^2(\mu-\overline{\mu(1-(\mu p^2)^r)}))}{1-\mu p^2}\right).$$

Connection with the number of self-avoiding paths.

As previously, because the local costs are independent and identically distributed, there is a simple relationship between the expected cost C and the expected size S. In particular, equation (12) above again holds in the general case where the attack starts at a vertex at distance $r > 0$ from the root, so the first step is to compute the expected size. However, because the attack does not start at the root, the connection with branching process can no longer be used. Instead, the main ingredient is to evaluate the following expected number of vertices/self-avoiding paths $$\Gamma_r(n) = E(\text{card } \{y \in V : d(x, y) = n\}) \quad (16)$$

where it is assumed that $d(0, x) = r$ and the attack starts at x.

Lemma 11—Assume that $G = \mathbb{T}_R$. Then, $$E_r(S) = \sum_{n=0}^{\infty} \Gamma_r(n) p^n.$$

PROOF. The probability of vertex y being hacked is equal to the probability of an open path connecting x where the attack starts from and y. Because there is exactly one self-avoiding path connecting the two vertices due to the lack of cycles, and because the edges are independently open with probability p, the probability of y being hacked is simply p at the power the length of this path, which is also the distance d(x, y) between the two vertices. In addition, letting $$\zeta(y) = 1\{\text{vertex } y \text{ is hacked}\} \text{ for all } y \in V,$$

the number of vertices being hacked can be written $$S = \text{card}(\mathcal{C}(x)) = \sum_{y \in V} \zeta(y) = \sum_{n=0}^{\infty} \sum_{y \in V} \zeta(y) 1\{d(x, y) = n\}.$$

Using that vertex y is being hacked with probability $E(\zeta(y)) = p^{d(x,y)}$ and taking the expected value in the previous equation, we deduce that $$E_r(S) = \sum_{n=0}^{\infty} E(\text{card}\{y \in V : d(x, y) = n\})p^n = \sum_{n=0}^{\infty} \Gamma_r(n)p^n.$$

This completes the proof. □

The next step is to compute the expected number of vertices in (16). To do so, we need the following lemma about the conditional expected number of edges starting from a vertex.

Lemma 12—We have $E(X-1|X \neq 0) = \overline{\mu}$.

PROOF. By conditioning on whether $X \neq 0$ or not, we get $$E(X) = E(X \mid X \neq 0)P(X \neq 0) + E(X \mid X = 0)P(X = 0)$$

$$= E(X \mid X \neq 0)P(\times \neq 0)$$

from which we deduce that $$E(X - 1 \mid X \neq 0) = \frac{E(X)}{P(X \neq 0)} - 1 = \frac{\mu}{1 - p_0} - 1 = \bar{\mu}.$$

This completes the proof.

Counting the expected number of vertices relies on basic combinatorics and the following three properties that hold for every vertex $x \neq 0$.

There is exactly one edge starting from x moving toward the root.

The expected number of edges starting from x moving away from the root is $\mu$.

Given that there is at least one edge starting from x moving away from the root, the expected number of additional such edges is $\bar{\mu}$ The approach to compute the number of vertices in (16) depends on the value of r and we now distinguish two cases: $0 < 2r < R$ and $2r > R > r$.

Expected size when $0 < 2r < R$.

We compute the expected number of vertices in (16) by distinguishing among what we shall call short, intermediate, and long paths. This distinction is motivated by the following:

Short paths starting from x with length $n \leq r$ can at most reach the root.

intermediate paths starting from x with length $r < n \leq R-r$ can at most reach one vertex at distance R from the root of the random tree, if any.

Long paths starting from x with length $n > R-r$ can reach multiple vertices at distance R from the root of the random tree, if any.

For short paths, we have the following estimate.

Lemma 13—Assume $n \leq r$ and $G = \mathbb{T}_R$. Then, $$\Gamma_r(n) = 1 + \bar{\mu}\left(\frac{1 - \mu^{n+1}}{1 - \mu}\right) + \mu^n.$$

PROOF. The idea is to count the expected number of self-avoiding paths with length n starting at the origin x of the attack. Due to the absence of cycles, when following a path starting from x, once we move away from the root, we can no longer move closer to the root without visiting a vertex visited previously. In particular, following a self-avoiding path consists in moving n–k times in a row toward the root and then k times in a row away from the root. Therefore, letting $\Gamma_{r,k}(n)$=expected number of paths moving k times away from the root, and using the three properties above, we get $$\Gamma_{r,k}(n) = 1x \ldots x1x\bar{\mu}\cdot x\mu x \ldots x\mu = \bar{\mu}\cdot \mu^{k-1} \text{ for all } 1 \leq k < n \quad (17)$$

where $\bar{\mu}$ is the expected number of possible edges one can follow the first time moving away from the root of the random tree. Note that, when k=0, we move n times in a row toward the root and there is only one possible edge to follow at each step therefore $$\Gamma_{r,k}(n) = 1x \ldots x1 = 1 \text{ for } k=0. \quad (18)$$

Finally, when k=n, we move n times in a row away from the root and there is an average of $\mu$ possible edges to follow at each step therefore $$\Gamma_{r,k}(n) = \mu x \ldots x\mu = \mu^n \text{ for } k=n. \quad (19)$$

Adding (17)-(19), we conclude that, for $n \leq r$, $$\Gamma_r(n) = \sum_{k=0}^{n} \Gamma_{r,k}(n) = 1 + \sum_{k=0}^{n-2} \bar{\mu}\mu^k + \mu^n = 1 + \bar{\mu}\left(\frac{1 - \mu^{n+1}}{1 - \mu}\right) + \mu^n.$$

This completes the proof. □

For intermediate paths, we have the following estimate.

Lemma 14—Assume $r < n \leq R-r$ and $G = \mathbb{T}_R$. Then, $$\Gamma_r(n) = \bar{\mu}\mu^{n-r-1}\left(\frac{1 - \mu^r}{1 - \mu}\right) + \mu^n.$$

PROOF. The idea is again to count the number of self-avoiding paths starting from x. For paths with length $r < n \leq R-r$, after r steps, we can only move away from the root. To count the number of such paths, we divide the path into three pieces by moving toward the root r–k times, then away from the root k times and away from the root another n–r times. After the first two steps, we moved r times therefore $\Gamma_{r,n-r+k}(n) = \mu^{n-r}\Gamma_{r,k}(r)$ for all $1 \leq k < r$.

This, together with (17), implies that $$\Gamma_{r,n-r+k}(n) = \mu^{n-r}\bar{\mu}\mu^{k-1} = \bar{\mu}\mu^{n-r+k-1} \text{ for all } 1 \leq k < r. \quad (20)$$

Note that, when k=0, because n>r, the path must go through the root. The expected number of possible edges to follow right after visiting the root is while the expected number of possible edges to follow at each of the subsequent n–r–1 steps is $\mu$ therefore $$\Gamma_{r,n-r+k}(n) = \bar{\mu}\mu^{n-r-1} \text{ for } k=0. \quad (21)$$

Finally, when k=r, we only move away from the root, so $$\Gamma_{r,n-r+k}(n) = \mu^n \text{ for } k=r. \quad (22)$$

Adding (20)-(22), we deduce that $$\Gamma_r(n) = \sum_{k=0}^{r} \Gamma_{r,n-r+k}(n) = \sum_{k=0}^{r-1} \bar{\mu}\mu^{n-r+k-1} + \mu^n = \bar{\mu}\mu^{n-r-1}\left(\frac{1 - \mu^r}{1 - \mu}\right) + \mu^n.$$

and the proof is complete.

Finally, when $R-r < n \leq R+r$, there is $1 \leq l \leq r$ such that (a)$n=R-r+2l-1$ or (b)$n=R-r+2l$.

Distinguishing between case (a) and case (b), we have the next lemma.

Lemma 15—Assume $G = \mathbb{T}_R$. For all $1 \leq l \leq r$, $$\Gamma_r(R - r + 2l - 1) = \sum_{k=l}^{r} \bar{\mu}\mu^{R-r+2l-k-2} = \bar{\mu}\mu^{R-2r+2l-2}\left(\frac{1 - \mu^{r-l+1}}{1 - \mu}\right)$$

$$\Gamma_r(R - r + 2l) = \sum_{k=l}^{r} \bar{\mu}\mu^{R-r+2l-k-1} = \bar{\mu}\mu^{R-2r+2l-1}\left(\frac{1 - \mu^{r-l+1}}{1 - \mu}\right)$$

PROOF. In both cases (a) and (b), the first l moves must be directed toward the root for the self-avoiding path to stay within distance R from the root, so the number of moves k toward the root can be any $l \leq k \leq r$, while the number of moves away from the root is n−k. In addition, the same argument as in Lemmas 13 and 14 implies that $\Gamma_{r,R-r+2l-k-1}(R-r+2l-1) = \mu^{R-r+2l-k-2}$ for all $l \le k \le r$ $\Gamma_{r,R-r+2l-k}(R-r+2l) = \bar{\mu}\mu^{R-r+2l-k-1}$ for all $l \le k \le r$.    5

Summing over all possible values of k gives the result. □

Combining Lemmas 11 and 13-15 and observing that $\Gamma_r(n)=0$ for all $n>R+r$, we obtain the following implicit expression for the expected value of the size:

$$E_r(S) = 1 + \sum_{n=1}^{r}\left(1+\bar{\mu}\left(\frac{1-\mu^{n-1}}{1-\mu}\right)+\mu^n\right)p^n + \sum_{n=r+1}^{R-r}\left(\bar{\mu}\mu^{n-r-1}\left(\frac{1-\mu^r}{1-\mu}\right)+\mu^n\right)p^n + \sum_{l=1}^{r}\sum_{k=l}^{r}\bar{\mu}(\mu^{R-r+2l-k-2}p^{R-r+2l-1}+\mu^{R-r+2l-k-1}p^{R-r+2l})$$

which can be reduced to $$E_r(S) = \sum_{n=1}^{r}\left(1+\bar{\mu}\left(\frac{1-\mu^{n-1}}{1-\mu}\right)\right)p^n + \sum_{n=r+1}^{R-r}\left(\bar{\mu}\mu^{n-r-1}\left(\frac{1-\mu^r}{1-\mu}\right)\right)p^n + \sum_{n=0}^{R-r}(\mu p)^n + \sum_{l=1}^{r}\sum_{k=l}^{r}\bar{\mu}(1+\mu p)\mu^{R-r+2l-k-2}p^{R-r+2l-1}. \quad (23)$$

Computing each sum in (23) gives the following lemma.

Lemma 16—For all $0 \le r \le R$, the right-hand side of (23) is $$\phi-(r) = \left(\frac{1-(\mu-\bar{\mu})}{1-\mu}\right)\left(\frac{p(1-p^r)}{1-p}\right) - \left(\frac{\bar{\mu}p}{1-\mu}\right)\left(\frac{1-(\mu p)^r}{1-\mu p}\right) + \bar{\mu}p^{r+1}\left(\frac{1-\mu^r}{1-\mu}\right)\left(\frac{1-(\mu p)^{R-2r}}{1-\mu p}\right) + \frac{1-(\mu p)^{R-r+1}}{1-\mu p} + \left(\frac{\bar{\mu}p^{R-r+1}}{1-\mu p}\right)\left(\frac{\mu^{R-2r}(1-\mu^r)}{1-\mu} - \frac{\mu^{R-r+1}p^2(1-(\mu p^2)^r)}{1-\mu p^2}\right).$$

The proof of Lemma 16 is mostly computational and can be found in the appendix.

Expected size when $2r>R>r$ and R is even.

In this case, the arguments in the proof of Lemma 13 are still valid for self-avoiding paths of length $n \le R-r$ rather than $n \le r$ so we have the following estimate:

$$\Gamma_r(n) = 1 + \bar{\mu}\left(\frac{1-\mu^{n-1}}{1-\mu}\right)+\mu^n \text{ for all } n \le R-r. \quad (24)$$

Now, when $R-r<n \le R+r$, there is $1 \le l \le r$ such that (a) $n = R-r+2l-1$ or (b) $n = R-r+2l$.

The proof of Lemma 15 easily extends to self-avoiding paths of length $n>r$, which corresponds to the condition $l>r-R/2$ when R is even. In particular, $$\Gamma_r(R-r+2l-1) = \sum_{k=1}^{r}\bar{\mu}\mu^{R-r+2l-k-2} = \bar{\mu}\mu^{R-2r+2l-2}\left(\frac{1-\mu^{-l+1}}{1-\mu}\right) \quad (25)$$

-continued $$\Gamma_r(R-r+2l) = \sum_{k=1}^{r}\bar{\mu}\mu^{R-r+2l-k-1} = \bar{\mu}\mu^{R-2r+2l-1}\left(\frac{1-\mu^{-l+1}}{1-\mu}\right)$$

for all $r-R/2<l \le r$. For intermediate self-avoiding paths of length $R-r<n \le r$, things are a little bit different. Following the proof of Lemma 14, the first l moves must be directed toward the root for the self-avoiding path to stay within distance R from the root. However, we now have $n \le r$ so the number of moves k toward the root can be any $1 \le k \le n$. In particular, we now have self-avoiding paths that only move toward the root (k=n). More precisely, $$\Gamma_{r,R-r+2l-k-1}(R-r+2l-1) = \begin{cases} \bar{\mu}\mu^{R-r+2l-k-2} & \text{for } l \le k < R-r+2l-1 \\ 1 & \text{for } k = R-r+2l-1. \end{cases}$$

Similarly, we have $$\Gamma_{r,R-r+2l-k}(R-r+2l) = \begin{cases} \bar{\mu}\mu^{R-r+2l-k-1} & \text{for } l \le k < R-r+2l \\ 1 & \text{for } k = R-r+2l. \end{cases}$$

Summing over all possible values of k gives $$\Gamma_r(R-r+2l-1) = 1 + \sum_{k=l}^{R-r+2l-2}\bar{\mu}\mu^{R-r+2l-k-2} = 1 + \bar{\mu}\left(\frac{1-\mu^{R-r+2l-1}}{1-\mu}\right) \quad (26)$$

$$\Gamma_r(R-r+2l) = 1 + \sum_{k=l}^{R-r+2l-1}\bar{\mu}\mu^{R-r+2l-k-1} = 1 + \bar{\mu}\left(\frac{1-\mu^{R-r+2l}}{1-\mu}\right)$$

For all $1 \le l \le r-R/2$. Combining Lemma 11 and (24)-(26), we obtain $$E_r(S) = 1 + \sum_{n=1}^{R-r}\left(1+\bar{\mu}\left(\frac{1-\mu^{n-1}}{1-\mu}\right)+\mu^n\right)p^n + \sum_{l=1}^{r-R/2}(p^{R-r+2l-1}+(1+\bar{\mu})p^{R-r+2l}) + \sum_{l=1}^{r-R/2}\sum_{k=1}^{R-r+2l-2}\bar{\mu}(\mu^{R-r+2l-k-2}p^{R-r+2l-1}+\mu^{R-r+2l-k-1}p^{R-r+2l}) + \sum_{l=r-R/2+1}^{r}\sum_{k=1}^{r}\bar{\mu}(\mu^{R-r+2l-k-2}p^{R-r+2l-1}+\mu^{R-r+2l-k-1}p^{R-r+2l})$$

which can be reduced to $$E_r(S) = \sum_{n=1}^{R-r}\left(1+\bar{\mu}\left(\frac{1-\mu^{n-1}}{1-\mu}\right)\right)p^n + \sum_{n=0}^{R-r}(\mu p)^n + \sum_{l=1}^{r-R/2}(1+(1+\bar{\mu})p)p^{R-r+2l-1} + \sum_{l=1}^{r-R/2}\sum_{k=1}^{R-r+2l-2}\bar{\mu}(1+\mu p)\mu^{R-r+2l-k-2}p^{R-r+2l-1} + \quad (27)$$

-continued $$\sum_{l=r-R/2+1}^{r}\sum_{k=l}^{r}\overline{\mu}(1+\mu p)\mu^{R-r+2l-k-2}p^{R-r+2l-1}$$

Computing each sum in (27) gives the following lemma.

Lemma 17—For all $0 \le r \le R$, the right-hand side of (23) is $$\phi_+(r) = \left(\frac{1-(\mu-\overline{\mu})}{1-\mu}\right)\left(\frac{p(1-p^{R-r})}{1-p}\right) - \left(\frac{\overline{\mu}p}{1-\mu}\right)\left(\frac{1-(\mu p)^{R-r}}{1-\mu p}\right) +$$

$$\frac{1-(\mu p)^{R-r+1}}{1-\mu p} + (1+(1+\overline{\mu})p)p^{R-r+1}\left(\frac{1-p^{2r-R}}{1-p^2}\right) +$$

$$\left(\frac{\overline{\mu}p^{R-r+1}}{1-\mu p}\right)\left(\frac{\mu^{R-2r}(1-\mu^r)}{1-\mu} - \frac{\mu^{R-r+1}p^2(1-(\mu p^2)^r)}{1-\mu p^2}\right) +$$

$$\left(\frac{\overline{\mu}(1+\mu p)p^{R-r+1}}{1-\mu}\right)\left(\left(\frac{1-p^{2r-R}}{1-p^2}\right) - \mu^{R-2r}\left(\frac{1-(\mu p)^{2r-R}}{1-(\mu p)^2}\right)\right).$$

The proof of Lemma 17 is mostly computational and can be found in the appendix.

Expected size when $r \in \{0, R/2, R\}$ and R is even.

As explained at the beginning of this section, we now show that the two expressions $\phi_\pm(r)$ found respectively in Lemmas 16 and 17 extend to the boundary cases. According to Theorem 2, $$E_0(S) = \frac{1-(\mu p)^{R+1}}{1-\mu p}.$$

Even though the proofs of Theorem 2 and (23) strongly differ, taking r=0 in the expression for the expected size in Lemma 16 gives (28) therefore $$E_0(S) = \phi_-(0).$$

When the distance r=R/2, Lemmas 13 and 15 still hold, but because r=R−r, there is no paths of intermediate length. In particular, the second sum in (23) equals zero so the expected size of the cyber attack when the distance from the root is R/2 reduces to $$E_{R/2}(S) = \sum_{n=1}^{R/2}\left(1+\overline{\mu}\left(\frac{1-\mu^{n-1}}{1-\mu}\right)\right)p^n + \qquad (29)$$

$$\sum_{n=0}^{R/2}(\mu p)^n + \sum_{l=1}^{R/2}\sum_{k=1}^{R/2}\overline{\mu}(1+\mu p)\mu^{R/2+2l-k-2}p^{R/2+2l-1}.$$

Computing each sum in (29), we find that the expression in Lemma 16 is still valid for r=R/2. In other words, we have the following lemma whose proof is in the appendix.

Lemma 18—The right-hand side of (29) is equal to $\phi_-(R/2)$.

Finally, when r=R, the condition $n \le R-r$ in (24) is equivalent to n=0 so the equation is not valid because there is obviously only one path of length zero starting from a given vertex. In particular, the expected size given that r=R reduces to $$E_{R/2}(S) = 1 + \sum_{l=1}^{R/2}(1+(1+\overline{\mu})p)p^{2l-1} + \qquad (30)$$

$$\sum_{l=1}^{R/2}\sum_{k=1}^{R/2}\overline{\mu}(1+\mu p)\mu^{2l-k-2}p^{2l-1} + \sum_{l=R/2+1}^{R/2}\sum_{k=1}^{R/2}\overline{\mu}(1+\mu p)\mu^{2l-k-2}p^{2l-1}.$$

As previously, computing each sum in (30), we find that the expression in Lemma 17 is still valid when the distance is r=R. In particular, we have the next lemma proved in the appendix.

Lemma 19—The right-hand side of (30) is equal to $\phi_+(R)$.

Combining (28) and Lemmas 18 and 19, we conclude that $$E_r(S) = \begin{cases} \phi_-(r) & \text{when } 0 \le 2r \le R \\ \phi_+(r) & \text{when } 2r > R \ge r \end{cases}. \qquad (31)$$

Simplifying $\phi_-(r)$ and $\phi_+(r)$.

In view of (31), to complete the proof, the last step is to show that $\phi_-(r)$ and $\phi_+(r)$ are both equal to the expression in the statement of the theorem. More precisely, we have the following lemma whose proof is purely computational and done in the appendix.

Lemma 20—For all $0 \le r \le R$, $$\phi_-(r) = \phi_+(r) = \frac{1}{1-\mu p}$$

$$\left(1 + \frac{p(1-p^r)(1-(\mu-\overline{\mu})p)}{1-p} - \frac{(\mu p)^{R-r+1}(1-p^2(\mu-\overline{\mu}(1-(\mu p^2)^r)))}{1-\mu p^2}\right).$$

Combining Lemma 20 and (31) gives $$E_r(S) = \frac{1}{1-\mu p}$$

$$\left(1 + \frac{p(1-p^r)(1-(\mu-\overline{\mu})p)}{1-p} - \frac{(\mu p)^{R-r+1}(1-p^2(\mu-\overline{\mu}(1-(\mu p^2)^r)))}{1-\mu p^2}\right)$$

for all $0 \le r \le R$.

In particular, Theorem 4 follows from the fact that $E_r(C) = E_r(S)E(C_0)$.

Proof of Theorem 5

We prove that the upper bound holds for each realization G=(V, E) of the random graph. Equation (13) is satisfied for all possible starting point $x \in V$ of the attack therefore $$\text{Var}_r(C) = E_r(S)\text{Var}(C_0) + \text{Var}_r(S)(E(C_0))^2$$

where r=d(0, x). In particular, it suffices to prove that $$\text{Var}_r(S) \le (p^{-2R}-1)(E_r(S))2. \qquad (32)$$

Recalling the definition of we have $$\text{Var}_r(S) = E_x\left(\left(\sum_{y \in V}\zeta(y)\right)^2\right) - \left(E_x\left(\sum_{y \in V}\zeta(y)\right)\right)^2$$

-continued $$Var_r(S) = E_x\left(\left(\sum_{y \in V} \zeta(y)\right)^2\right) - \left(E_x\left(\sum_{y \in V} \zeta(y)\right)\right)^2$$

then using that $E_x(\zeta(y)\zeta(z)) = P_x(\zeta(y) = \zeta(z) = 1)$.

$$Var_r(S) = \sum_{y,z \in V} P_x(\zeta(y) = \zeta(z) = 1) - \sum_{y,z \in V} P_x(\zeta(y) = 1)P_x(\zeta(z) = 1) = \quad (33)$$
$$\sum_{y,z \in V}(P_x(\zeta(y) = \zeta(z) = 1) - P_x(\zeta(y) = 1)P_x(\zeta(z) = 1)).$$

To simplify the notation, let $$q_x(y,z) = P_x(\zeta(y) = \zeta(z) = 1) - P_x(\zeta(y) = 1)P_x(\zeta(z) = 1).$$

The probability that vertex y is being hacked is simply p at the power d(x, y), which is also the length of the unique self-avoiding path x→y. The probability that two given vertices y and z are being hacked is more complicated because the two self-avoiding paths x→y and x→z can overlap. The probability that both self-avoiding paths are open is p at the power $$d(x,y)+d(x,z)-r(x,y,z)$$

where r(x, y, z) is the number of edges the two self-avoiding paths x→y and x→z have in common, which is always at most the diameter of the graph therefore *

$$q_x(y, z) = p^{d(x, y) + d(x, z) - r(x, y, z)} - p^{d(x, y) + d(x, z)} = \quad (34)$$
$$p^{d(x,y)+d(x,z)}(p^{-r(x, y, z)} - 1) \leq p^{d(x,y)+d(x,z)}(p^{-2R} - 1).$$

Combining (33) and (34), we conclude that $$Var_r(S) = \sum_{y,z \in V} q_x(y, z) \leq \sum_{y,z \in V} p^{d(x,y)+d(x,z)}(p^{-2R} - 1) =$$
$$(p^{-2R} - 1)\sum_{y,z \in V} P_x(\zeta(y) = 1)P_x(\zeta(z) = 1) = (p^{-2R} - 1)(E_r(S))^2.$$

This shows (32) and completes the proof. \
Proof of Corollary 6

The key to prove Corollary 6 is to condition on the distance D between the root and the starting point of the attack. For the deterministic tree with X=d, $$P(D = r) = \frac{d^r}{\text{card}(V)} = \left(\frac{d^r}{1 + d + \ldots + d^R}\right) = d^r\left(\frac{1-d}{1-d^{R+1}}\right). \quad (35)$$

In addition, the conditional expectation given D is equal to $$E(C \mid D) = \sum_{r=0}^{R} E(C \mid D = r)1\{D = r\} = \sum_{r=0}^{R} E_r(C)1\{D = r\}. \quad (36)$$

Taking the expected value in (36), and using (35) and Theorem 4, $$E(C) = E(E(C \mid D)) = \sum_{r=0}^{R} E_r(C)P(D = r) = \left(\frac{1-d}{1-d^{R+1}}\right)\sum_{r=0}^{R} d^r E_r(S)E(C_0)$$

which proves the first part of the corollary. Now, taking the variance in (36), $$Var(E(C \mid D)) =$$
$$Var\left(\sum_{r=0}^{R} E_r(C)1\{D = r\}\right) = \sum_{r,s} E_r(C)E_s(C)\text{cov}(1\{D = r\}, 1\{D = s\}) =$$
$$\sum_{r,s} E_r(C)E_s(C)(P(D = r, D = s) - P(D = r)P(D = s))$$

then distinguishing between r=s and r≠s, and using (35) and Theorem 4, $$Var(E(C \mid D)) = \sum_{r=0}^{R}\left(\frac{d^r(1-d)}{1-d^{R+1}}\right)\left(1 - \frac{d^r(1-d)}{1-d^{R+1}}\right)(E_r(S)E(C_0))^2 - \quad (37)$$
$$\sum_{r \neq s} d^{r+s}\left(\frac{1-d}{1-d^{R+1}}\right)^2 E_r(S)E_s(S)(E(C_0))^2.$$

In other respects, the conditional variance is $$Var(C \mid D) = \sum_{r=0}^{R} Var(C \mid D = r)1\{D = r\} = \sum_{r=0}^{R} Var_r(C)1\{D = r\}$$

Then taking the expected value and applying Theorem 5, $$E(Var(C \mid D)) = \sum_{r=0}^{R} Var_r(C)P(D = r) = \sum_{r=0}^{R} d^r\left(\frac{1-d}{1-d^{R+1}}\right)Var_r(C) \leq \quad (38)$$
$$\sum_{r=0}^{R} d^r\left(\frac{1-d}{1-d^{R+1}}\right)(E_r(S)\text{Var}(C_0) + (p^{-2R} - 1)(E_r(S)E(C_0))^2).$$

The law of total variance implies that the unconditional variance of the cost is equal to the sum of the left-hand side of (37) and the left-hand side of (38). This give the bound $$Var(C) \leq \left(\frac{1-d}{1-d^{R+1}}\right)\left(\sum_{r=0}^{R} d^r E_r(S)\text{Var}(C_0) +$$
$$\left(\sum_{r=0}^{R} d^r(p^{-2R} - 1)(E_r(S))^2 + \sum_{r=0}^{R} d^r\left(1 - \frac{d^r(1-d)}{1-d^{R+1}}\right)(E_r(S))^2 -$$
$$\left(\frac{1-d}{1-d^{R+1}}\right)\sum_{r \neq s} d^{r+s} E_r(S)\right)(E(C_0))^2\right) =$$
$$\left(\frac{1-d}{1-d^{R+1}}\right)\left(\sum_{r=0}^{R} d^r E_r(S)\text{Var}(C_0) +$$
$$\left(\sum_{r=0}^{R} d^r p^{-2R}(E_r(S))^2 - \left(\frac{1-d}{1-d^{R+1}}\right)\sum_{r,s} d^{r+s} E_r(S)E_s(S)\right)(E(C_0))^2\right)$$

which proves the second part of the corollary. Finally, the expression of the conditional expected value $E_r(S)$ for the tree with X=d is easily obtained by setting $$\mu = E(X) = d \text{ and } \bar{\mu} = \frac{d}{1-0} - 1 = d-1$$

in the expression for the conditional expected value in Theorem 4.

Appendix A: Proof of Lemma 10

PROOF OF LEMMA 10. A direct calculation gives $$S_1 = \sum_{n=0}^{R}\left(v^{n-1}\sum_{k=0}^{n-1}v^k\right) = \sum_{n=0}^{R}\left(v^{n-1}\left(\frac{1-v^n}{1-v}\right)\right) = \frac{1}{1-v}\sum_{n=1}^{R}v^{n-1}-v^{2n-1} = \tag{39}$$

$$\frac{1}{1-v}\sum_{n=0}^{R-1}(v^n - vv^{2n}) = \left(\frac{1}{1-v}\right)\left(\frac{1-v^R}{1-v} - \frac{v(1-v^{2R})}{1-v^2}\right).$$

Similarly, we have $$S_2 = \sum_{m=1}^{R}\sum_{n=0}^{m-1}\left(v^{m-1}\sum_{k=0}^{n-1}v^k\right) = \sum_{m=1}^{R}\sum_{n=0}^{m-1}\left(v^{m-1}\left(\frac{1-v^n}{1-v}\right)\right) =$$

$$\frac{1}{1-v}\sum_{m=1}^{R}\left(v^{m-1}\sum_{n=0}^{m-1}(1-v^n)\right) = \frac{1}{1-v}\sum_{m=1}^{R}v^{m-1}\left(m-\frac{1-v^m}{1-v}\right).$$

Observing also that $$\sum_{m=1}^{R}mv^{m-1} = \frac{\partial}{\partial v}\left(\sum_{m=0}^{R}v^m\right) = \frac{\partial}{\partial v}\left(\frac{1-v^{R+1}}{1-v}\right) = \frac{1-v^R(1+R(1-v))}{(1-v)^2},$$

we deduce that $S_2$ is given by $$S_2 = \frac{1}{1-v}\left(\frac{1-v^R(1+R(1-v))}{(1-v)^2} - \frac{1}{1-v}\sum_{m=0}^{R-1}(v^{m-1}-vv^{2m})\right) = \tag{40}$$

$$\frac{1}{1-v}\left(\frac{1-v^R(1+R(1-v))}{(1-v)^2} - \frac{1}{1-v}\left(\frac{1-v^R}{1-v} - \frac{v(1-v^{2R})}{1-v^2}\right)\right) =$$

$$\frac{1}{(1-v)^2}\left(-Rv^R + \frac{v(1-v^{2R})}{1-v^2}\right).$$

Since $\text{Var}_0(S)=\Sigma^2(S_1+2S_2)$ according to Lemma 9, (39) and (40) give $$\text{Var}_0(S) = \frac{\Sigma^2}{1-v}\left(\frac{1-v^R}{1-v} - \frac{v(1-v^{2R})}{1-v^2}\right) + \frac{2\Sigma^2}{(1-v)^2}\left(-Rv^R + \frac{v(1-v^{2R})}{1-v^2}\right) =$$

$$\frac{\Sigma^2}{1-v}\left(\frac{1-(2R+1)v^R}{1-v} - \left(1-\frac{2}{1-v}\right)\frac{v(1-v^{2R})}{1-v^2}\right) =$$

$$\frac{\Sigma^2}{(1-v)^2}\left(1-(2R+1)v^R + \frac{v(1-v^{2R})}{1-v}\right) =$$

-continued $$\frac{\Sigma^2}{(1-v)^2}\left(\frac{1-v^{2R+1}}{1-v} - (2R+1)v^R\right).$$

This completes the proof.

Appendix B: Proof of Lemmas 16-20

The appendix gives the proofs of all the lemmas that rely on basic algebra and do not involve any probabilistic or combinatorial reasoning.

PROOF OF LEMMA 16. The first sum in (23) can be written as $$S_1^-(r) = \sum_{n=1}^{r}\left(1+\bar{\mu}\left(\frac{1-\mu^{n-1}}{1-\mu}\right)\right)p^n = \tag{41}$$

$$\sum_{n=1}^{r}\left(1+\frac{\bar{\mu}}{1-\mu}\right)p^n - \sum_{n=1}^{r}\left(\frac{\bar{\mu}p}{1-\mu}\right)(\mu p)^{n-1} =$$

$$\left(\frac{1-(\mu-\bar{\mu})}{1-\mu}\right)\left(\frac{p(1-p^r)}{1-p}\right) - \left(\frac{\bar{\mu}p}{1-\mu}\right)\left(\frac{1-(\mu p)^r}{1-\mu p}\right)$$

The second sum in (23) is $$S_2^-(r) = \sum_{n=r+1}^{R-r}\left(\bar{\mu}\mu^{n-r-1}\left(\frac{1-\mu^r}{1-\mu}\right)\right)p^n = \tag{42}$$

$$\bar{\mu}p^{r+1}\left(\frac{1-\mu^r}{1-\mu}\right)\sum_{n=r+1}^{R-r}(\mu p)^{n-r-1} = \bar{\mu}p^{r+1}\left(\frac{1-\mu^r}{1-\mu}\right)\left(\frac{1-(\mu p)^{R-2r}}{1-\mu p}\right)$$

while the third sum in (23) is $$S_3^-(r) = \sum_{n=0}^{R-r}(\mu p)^R = \frac{1-(\mu p)^{R-r+1}}{1-\mu p}. \tag{43}$$

To compute the double sum in (23), we first sum over l to get $$S_4^-(r) = \sum_{k=1}^{r}\sum_{l=1}^{k}\bar{\mu}(1+\mu p)\mu^{R-r+2l-k-2}p^{R-r+2l-1} =$$

$$\sum_{k=1}^{r}\bar{\mu}(1+\mu p)\mu^{R-r-k}p^{R-r+1}\sum_{l=0}^{k-1}(\mu p)^{2l} =$$

$$\sum_{k=1}^{r}\bar{\mu}(1+\mu p)\mu^{R-r-k}p^{R-r+1}\left(\frac{1-(\mu p)^{2k}}{1-(\mu p)^2}\right).$$

Then, using $1-(\mu p)^2=(1-\mu p)(1+\mu p)$ and summing over k, $$S_4^-(r) = \left(\frac{\bar{\mu}p^{R-r+1}}{1-\mu p}\right)\left(\mu^{R-2r}\sum_{k=0}^{r-1}\mu^k - \mu^{R-r+1}p^2\sum_{k=0}^{r-1}(\mu p^2)^k\right) = \tag{44}$$

-continued
$$\left(\frac{\bar{\mu}p^{R-r+1}}{1-\mu p}\right)\left(\frac{\mu^{R-2r}(1-\mu^r)}{1-\mu}-\frac{\mu^{R-r+1}p^2(1-(\mu p^2)^r)}{1-\mu p^2}\right).$$

Combining (23)-(44) completes the proof. □

PROOF OF LEMMA 17. Following the proof of Lemma 16, the first sum in (27) is $$S_1^+(r) = \left(\frac{1-(\mu-\bar{\mu})}{1-\mu}\right)\left(\frac{p(1-p^{R-r})}{1-p}\right)-\left(\frac{\bar{\mu}p}{1-\mu}\right)\left(\frac{1-(\mu p)^{R-r}}{1-\mu p}\right). \quad (45)$$

The second sum in (27) is $$S_2^+(r) = \sum_{n=0}^{R-r}(\mu p)^n = \frac{1-(\mu p)^{R-r+1}}{1-\mu p} \quad (46)$$

while the third sum in (27) is $$S_3^+(r) = \sum_{i=1}^{r-R/2}(1+(1+\bar{\mu})p)p^{R-r+2l-1} = \quad (47)$$

$$(1+(1+\bar{\mu})p)p^{R-r+1}\sum_{i=0}^{r-R/2-1}p^{2l} = (1+(1+\bar{\mu})p)p^{R-r+1}\left(\frac{1-p^{2r-R}}{1-p^2}\right).$$

Letting the common summand in the two double sums in (27) be $$a(R,r,l,k) = (1+\bar{\mu})\mu^{R-r+2l-k-2}p^{R-r+2l-1}$$

and adding these two double sums give $$\sum_{l=1}^{r-R/2}\sum_{k=l}^{R-r+2l-2}a(R,r,l,k) + \sum_{l=r-R/2+1}^{r}\sum_{k=1}^{r}a(R,r,l,k) =$$

$$\sum_{l=1}^{r-R/2}\left(\sum_{k=l}^{r}a(R,r,l,k) - \sum_{k=R-r+2l-1}^{r}a(R,r,l,k)\right) +$$

$$\sum_{l=r-R/2+1}^{r}\sum_{k=l}^{r}a(R,r,l,k) =$$

$$\sum_{l=1}^{r}\sum_{k=l}^{r}a(R,r,l,k) - \sum_{l=1}^{r-R/2}\sum_{k=R-r+2l-1}^{r}a(R,r,l,k) = S_4^+(r) - S_5^+(r).$$

As in the proof of Lemma 16, $$S_4^+(r) = \left(\frac{\bar{\mu}p^{R-r+1}}{1-\mu p}\right)\left(\frac{\mu^{R-2r}(1-\mu^r)}{1-\mu}-\frac{\mu^{R-r+1}p^2(1-(\mu p^2)^r)}{1-\mu p^2}\right). \quad (48)$$

To compute $S_X^+(r)$, we first observe that $$\sum_{k=R-r+2l-1}^{r}\mu^{R-r+2l-k-2} =$$

-continued
$$\mu^{R-2r-2l-2}\sum_{k=0}^{2r-R-2l+1}\mu^k = \mu^{R-2r+2l-2}\left(\frac{1-\mu^{2r-R-2l+2}}{1-\mu}\right) = -\left(\frac{1-\mu^{R-2r+2l-2}}{1-\mu}\right).$$

It follows that $$S_5^+(r) = -\sum_{l=1}^{r-R/2}\bar{\mu}(1+\mu p)p^{R-r+2l-1}\left(\frac{1-\mu^{R-2r+2l-2}}{1-\mu}\right) = \quad (49)$$

$$-\left(\frac{\bar{\mu}(1+\mu p)p^{R-r+1}}{1-\mu}\right)\left(\sum_{l=0}^{r-R/2-1}p^{2l} - \mu^{R-2r}\sum_{l=0}^{r-R/2-1}(\mu p)^{2l}\right) =$$

$$-\left(\frac{\bar{\mu}(1+\mu p)p^{R-r+1}}{1-\mu}\right)\left(\left(\frac{1-p^{2r-R}}{1-p^2}\right)-\mu^{R-2r}\left(\frac{1-(\mu p)^{2r-R}}{1-(\mu p)^2}\right)\right).$$

Combining (27)-(49) completes the proof. □

PROOF OF LEMMA 18. First, we observe that the right-hand side of (29) is $$s_1^-(R/2)+S_3^-(R/2)+S_4^-(R/2).$$

$$s_1^-(R/2)+S_3^-(R/2)+S_4^-(R/2).$$

In particular, using (41), (43) and (44), and setting r=R/2, we get $$E_{R/2}(S) = \left(\frac{1-(\mu-\bar{\mu})}{1-\mu}\right)\left(\frac{p(1-p^{R/2})}{1-p}\right)-\left(\frac{\bar{\mu}p}{1-\mu}\right)\left(\frac{1-(\mu p)^{R/2}}{1-\mu p}\right)+$$

$$\frac{1-(\mu p)^{R/2+1}}{1-\mu p}+\left(\frac{\bar{\mu}p^{R/2+1}}{1-\mu p}\right)\left(\frac{1-\mu^{R/2}}{1-\mu}-\frac{\mu^{R/2+1}p^2(1-(\mu p^2)^{R/2})}{1-\mu p^2}\right).$$

It is straightforward to check that this is equal to $\phi_-(R/2)$. □

PROOF OF LEMMA 19. This is similar to the proof of Lemma 18. Referring to the notations introduced in the proof of Lemma 17, we observe that the right-hand side of (30) is $$1+S_3^+(R)+S_{e4}^+(R)-S_5^+(R).$$

Then, using (47)-(49), and setting r=R, we get $$E_R(S) = 1+(1+(1+\bar{\mu})p)p\left(\frac{1-p^R}{1-p^2}\right)+$$

$$\left(\frac{\bar{\mu}p}{1-\mu p}\right)\left(\frac{\mu^{-R}(1-\mu^R)}{1-\mu}-\frac{\mu p^2(1-(\mu p^2)^R)}{1-\mu p^2}\right)+$$

$$\left(\frac{\bar{\mu}(1+\mu p)p}{1-\mu}\right)\left(\left(\frac{1-p^R}{1-p^2}\right)-\mu^{-R}\left(\frac{1-(\mu p)^R}{1-(\mu p)^2}\right)\right).$$

It is straightforward to check that this is equal to $\phi_+(R)$.

PROOF OF LEMMA 20. Referring to the proof of Lemma 16, we write $$S_1^-(r) = \sigma_1^+(r)-\sigma_1^-(r)$$

$$S_2^-(r) = (1-(\mu p)^{R-2r})\sigma_2(r)$$

$$S_3^-(r) = (1-(\mu p)^{R-r-1})\sigma_3(r)$$

where $\sigma_1^+(r)$, $\sigma_2(r)$ and $\sigma_3(r)$ are given by $$\sigma_1^+(r) = \left(\frac{1-(\mu-\bar{\mu})}{1-\mu}\right)\left(\frac{p(1-p^r)}{1-p}\right) \quad \sigma_1^-(r) = \left(\frac{\bar{\mu}p}{1-\mu}\right)\left(\frac{1-(\mu p)^r}{1-\mu p}\right)$$

$$\sigma_2(r) = \bar{\mu}p^{r+1}\left(\frac{1-\mu^r}{1-\mu}\right)\left(\frac{1}{1-\mu p}\right) \quad \sigma_3(r) = \left(\frac{1}{1-\mu p}\right).$$

The numerator of $\sigma_2(r)$ minus the numerator of $\sigma_1^-(r)$ reduces to $$\bar{\mu}p^{r+1}(1-\mu^r) - \bar{\mu}p(1-(\mu p)^r) = \bar{\mu}p(p^r - 1)$$

from which it follows that $$\sigma_1^+(r) - \sigma_1^-(r) + \sigma_2(r) = \left(\frac{1-(\mu-\bar{\mu})}{1-\mu}\right)\frac{p(1-p^r)}{1-p} + \frac{\bar{\mu}p(p^r-1)}{(1-\mu)(1-\mu p)} =$$

$$\frac{p(1-p^r)}{1-\mu}\left(\frac{1-(\mu-\bar{\mu})}{1-p} - \frac{\bar{\mu}}{1-\mu p}\right) =$$

$$\frac{p(1-p^r)(1-\mu)(1-(\mu-\bar{\mu})p)}{(1-\mu)(1-p)(1-\mu p)} = \frac{p(1-p^r)(1-(\mu-\bar{\mu})p)}{(1-p)(1-\mu p)}.$$

Adding also $\sigma_3(r)$, we obtain $$S_1^-(r) + \sigma_2(r) + \sigma_3(r) = \frac{1}{1-\mu p}\left(1 + \frac{p(1-p^r)(1-(\mu-\bar{\mu})p)}{1-p}\right). \quad (50)$$

Now, we write $S_4^-(r) = \sigma_4^+(r) - \sigma_4^-(r)$ where $$\sigma_4^+(r) = \left(\frac{\bar{\mu}p^{R-r+1}}{1-\mu p}\right)\left(\frac{\mu^{R-2r}(1-\mu^r)}{1-\mu}\right)$$

$$\sigma_4^-(r) = \left(\frac{\bar{\mu}p^{R-r+1}}{1-\mu p}\right)\left(\frac{\mu^{R-r+1}p^2(1-(\mu p^2)^r)}{1-\mu}\right),$$

and observe that $$\sigma_4^+(r) - (\mu p)^{R-2r}\sigma_2(r) = \quad (51)$$

$$\left(\frac{\bar{\mu}p^{R-r+1}}{1-\mu p}\right)\frac{\mu^{R-2r}(1-\mu^r)}{1-\mu} - \bar{\mu}p^{r+1}\left(\frac{1-\mu^r}{1-\mu}\right)\frac{(\mu p)^{R-2r}}{1-\mu p} =$$

$$\frac{\bar{\mu}(1-\mu^r)}{(1-\mu p)(1-\mu)}\left(p^{R-r+1}\mu^{R-2r} - p^{r+1}(\mu p)^{R-2r}\right) = 0$$

Note also that $$\sigma_4^-(r) + (\mu p)^{R-r+1}\sigma_3(r) = \quad (52)$$

$$\left(\frac{\bar{\mu}p^{R-r+1}}{1-\mu p}\right)\left(\frac{\mu^{R-r+1}p^2(1-(\mu p^2)^r)}{1-\mu p^2}\right) + \frac{(\mu p)^{R-r+1}}{1-\mu p} =$$

$$\frac{(\mu p)^{R-r+1}}{(1-\mu p)(1-\mu p^2)}(\bar{\mu}p^2(1-(\mu p^2)^r) + (1-\mu p^2)) =$$

$$\frac{(\mu p)^{R-r+1}(1-p^2(\mu-\bar{\mu}(1-(\mu p^2)^r)))}{(1-\mu p)(1-\mu p^2)}.$$

Combining (50)-(52), we deduce that $$\phi_-(r) = \frac{1}{1-\mu p}\left(1 + \frac{p(1-p^r)(1-(\mu-\bar{\mu})p)}{1-p} - \frac{(\mu p)^{R-r+1}(1-p^2(\mu-\bar{\mu}(1-(\mu p^2)^r)))}{1-\mu p^2}\right).$$

To complete the proof of the lemma, it suffices to show that $\phi_+(r) - \phi_-(r) = 0$. Referring to the proofs of Lemmas 16 and 17, we have $$S_3^-(r) = S_2^+(r) \text{ and } S_4^-(r) = S_4^+(r)$$

from which it follows that $$\phi_+(r) - \phi_-(r) = \left(\frac{1-(\mu-\bar{\mu})}{1-\mu}\right)\left(\frac{p(p^r - p^{R-r})}{1-p}\right) - \left(\frac{\bar{\mu}p}{1-\mu}\right)\left(\frac{(\mu p)^r - (\mu p)^{R-r}}{1-\mu p}\right) -$$

$$\bar{\mu}p^{r+1}\left(\frac{1-\mu^r}{1-\mu}\right)\left(\frac{1-(\mu p)^{R-2r}}{1-\mu p}\right) + (1+(1+\bar{\mu})p)p^{R-r+1}\left(\frac{1-p^{2r-R}}{1-p^2}\right) +$$

$$\left(\frac{\bar{\mu}(1+\mu p)p^{R-r+1}}{1-\mu}\right)\left(\left(\frac{1-p^{2r-R}}{1-p^2}\right) - \mu^{R-2r}\left(\frac{1-(\mu p)^{2r-R}}{1-(\mu p)^2}\right)\right).$$

Multiplying by $(1-\mu)(1-p^2)(1-\mu p)^2$, we get $(1-\mu)(1-p^2)(1-\mu p)^2(\phi_+(r)-\phi_-(r)) = (1+p)(1-(\mu p)^2)(1-(\mu-\bar{\mu}))p(p^r-p^{R-r})-(1-p^2)(1+\mu p)[(\mu p)^r-(\mu p)^{R-r}]+$
$p^r(1-\mu^r)(1-(\mu p)^{R-2r})]\bar{\mu}p+(1-\mu)(1-(\mu p)^2)(1+(1+\bar{\mu})p)p^{R-r+1}(1-p^{2r-r})+\bar{\mu}(1+\mu p)p^{R-r+1}[(1-(\mu p)^2)$
$(1-p^{2r-R})-1-p^2)\mu^{R-2r}(1-(\mu p)^{2r-R})].$ Expanding and simplifying shows that the right-hand side equals zero. □

Exemplary Computing Device Configured for Percolation Model

Figure 5:
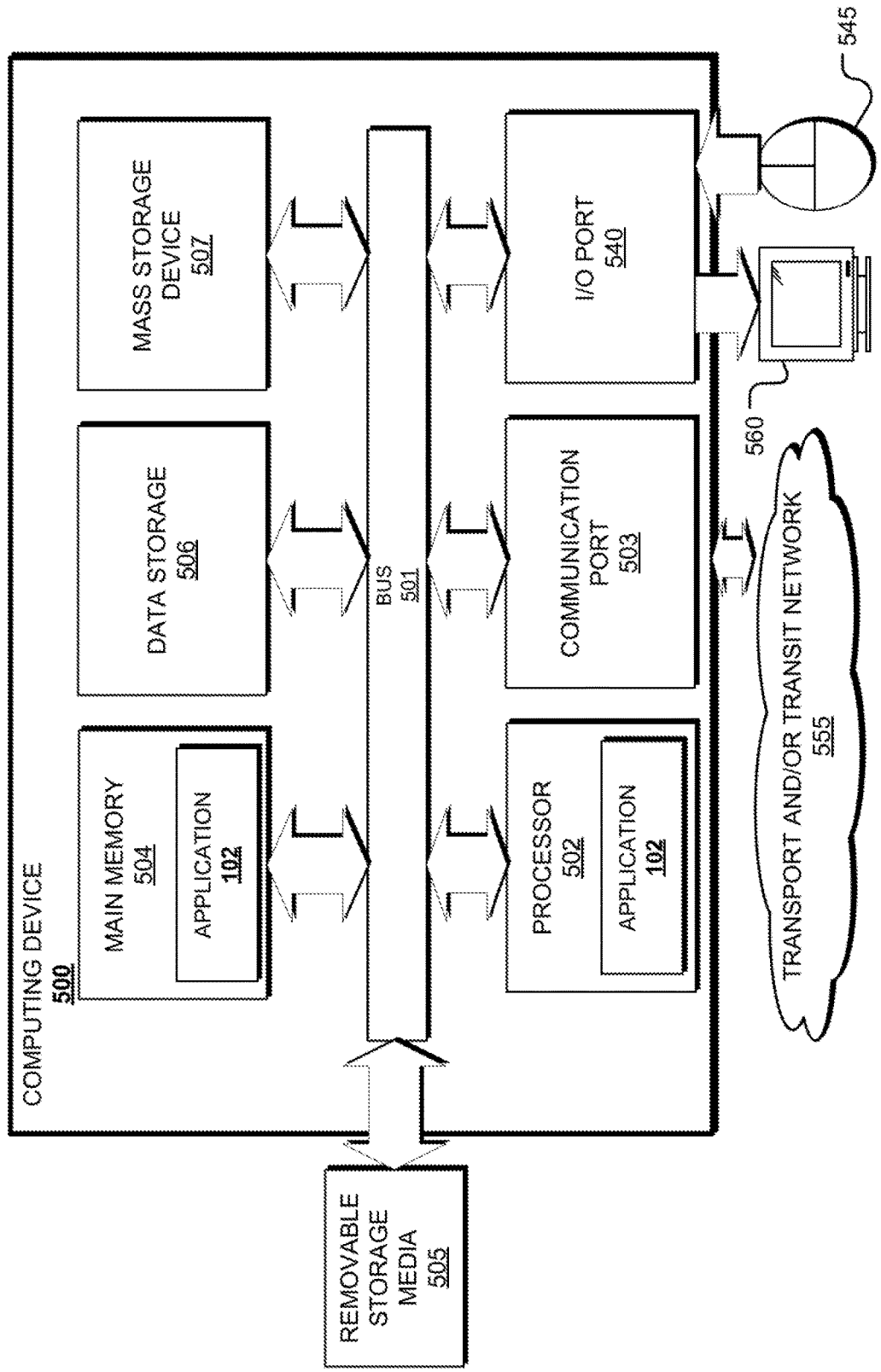
FIG. 5 is an example schematic diagram of a computing device that may implement various methodologies of the percolation model described herein.

Referring to FIG. 5, a computing device 500 may be used to implement various aspects of the model 101 described herein. More particularly, in some embodiments, aspects of the model 101 may be translated to software or machine-level code, which may be installed to and/or executed by the computing device 500 such that the computing device 500 is configured to model or otherwise assess loss distribution for cyber risk of small or medium-sized enterprises with tree based LAN topology as described herein. It is contemplated that the computing device 500 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 500 may include various hardware components, such as a processor 502, a main memory 504 (e.g., a system memory), and a system bus 501 that couples various components of the computing device 500 to the processor 502. The system bus 501 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 500 may further include a variety of memory devices and computer-readable media 507 that includes removable/non-removable media and volatile/non-volatile media and/or tangible media, but excludes transitory propagated signals. Computer-readable media 507 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 500. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 504 includes computer storage media in the form of volatile/nonvolatile memory such as read only memory (ROM) and random access memory (RAM). A basic input/output system (BIOS), containing the basic routines that help to transfer information between elements within the computing device 500 (e.g., during start-up) is typically stored in ROM. RAM typically contains data and/or program modules that are immediately accessible to and/or presently being operated on by processor 502. Further, data storage 506 in the form of Read-Only Memory (ROM) or otherwise may store an operating system, application programs, and other program modules and program data.

The data storage 506 may also include other removable/non-removable, volatile/nonvolatile computer storage media. For example, the data storage 506 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 500.

A user may enter commands and information through a user interface 540 (displayed via a monitor 560) by engaging input devices 545 such as a tablet, electronic digitizer, a microphone, keyboard, and/or pointing device, commonly referred to as mouse, trackball or touch pad. Other input devices 545 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 545 are in operative connection to the processor 502 and may be coupled to the system bus 501, but may be connected by other interface and bus structures, such as a parallel port, game port or a universal serial bus (USB). A monitor 560 or other type of display device may also be connected to the system bus 501. The monitor 560 may also be integrated with a touch-screen panel or the like.

The computing device 500 may be implemented in a networked or cloud-computing environment using logical connections of a network interface 503 to one or more remote devices, such as a remote computer. The remote computer may be a personal computer, a server, a router, a network PC, a peer device or other common network node, and typically includes many or all of the elements described above relative to the computing device 500. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 500 may be connected to a public and/or private network through the network interface 503. In such embodiments, a modem or other means for establishing communications over the network is connected to the system bus 501 via the network interface 503 or other appropriate mechanism. A wireless networking component including an interface and antenna may be coupled through a suitable device such as an access point or peer computer to a network. In a networked environment, program modules depicted relative to the computing device 500, or portions thereof, may be stored in the remote memory storage device.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 502, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for simulating losses due to cyberattacks comprising:
    providing a processor operable for executing instructions including:
        (1) generating a rooted random tree, including
            specifying a number of random trees to be constructed,
            specifying the values of parameters that characterize each of the plurality of simulations concerning random trees,
            applying a command for sampling from a multinomial distribution, based on the above parameters, to generate a plurality of offsprings starting from the root of the random tree in a particular simulation,
            applying a loop that iterates through levels of the random tree in the particular simulation, and
            as tree grows, labeling every vertex in the random tree by a unique integer in ordered manner;
        (2) generating a contagion process of the edges of the random tree, including
            specifying the values of parameters that characterize randomness related to contagions of edges on a particular random tree,
            generating repeated samples from a Bernoulli distribution in a separate column array which has the same height as the matrix that stores the edges of the particular random tree,
            selecting only columns of the matrix which contain successful Bernoulli trials,
            storing those columns in a separate matrix, and
            considering that edges associated with the successful Bernoulli trials represent possible channels of contagion process in a random tree;
        (3) selecting a node in the random tree that will be infected and represent a starting node of the contagion process;
        (4) identifying nodes that can be reached by the contagion process;
        (5) generating losses on each of the nodes and aggregating the losses; and
        (6) repeating steps (1)-(5) to generate new total losses originating from a cyber-attack.

2. The method of claim 1, wherein choosing the node that will be infected and be the starting point of the contagion comprises:
    finding the maximum integer in the matrix that stores the edges of the particular random tree; and
    choosing an integer uniformly at random between one and the maximum above, in order to determine, in a particular tree, the infected node from which contagion process starts.

3. The method of claim 1, wherein identifying the nodes that can be reached by the contagion process comprises using the matrix of edges associated to successful Bernoulli trials in order to identify the set of nodes that can be reached from the starting node by the contagion process.

4. The method of claim 1, wherein generating losses comprises:
    specifying the probability distribution and values of parameters that characterize each of the plurality of losses associated to the nodes reached by a particular contagion process; and
    given the above specification, generating and summing as many losses as the number of nodes that can be reached by a particular contagion process which is considered to be a total loss caused by one cyber-attack.

5. An apparatus for modeling loss distribution for cyber risk, comprising:
    a processor for implementing a structural percolation model that considers a physical layer of a network and assumes a tree network topology to model loss, and is configured to:
        (1) generate a rooted random tree;
        (2) generate a contagion process of the edges of the random tree, wherein the processor
            specifies the values of parameters that characterize randomness related to contagions of edges on a particular random tree,
            generates repeated samples from a Bernoulli distribution in a separate column array which has the same height as the matrix that stores the edges of the particular random tree,
            selects only columns of the matrix which contain successful Bernoulli trials,
            stores the only columns in a separate matrix, and
            considers that edges associated with the successful Bernoulli trials represent possible channels of contagion process in a random tree;
        (3) select a node in the random tree that will be infected and represent a starting node of the contagion process;
        (4) identify nodes that can be reached by the contagion process;
        (5) generate losses on each of the nodes and aggregating the losses; and
        (6) repeat steps (1)-(5) to generate new total losses originating from a cyber-attack.

6. The apparatus of claim 5, wherein to generate the random tree the processor is further configured to:
   specify a number of random trees to be constructed;
   specify the values of parameters that characterize each of the plurality of simulations concerning random trees;
   apply a command for sampling from a multinomial distribution, based on the above parameters, to generate a plurality of offsprings starting from the root of the random tree in a particular simulation;
   apply a loop that iterates through levels of the random tree in the particular simulation; and
   as tree grows, label every vertex in the random tree by a unique integer in ordered manner.

7. The apparatus of claim 5, wherein to choose the node that will be infected and be the starting point of the contagion comprises:
   finding the maximum integer in the matrix that stores the edges of the particular random tree; and
   choosing an integer uniformly at random between one and the maximum above, in order to determine, in a particular tree, the infected node from which contagion process starts.

8. A computer implemented method for modeling loss distribution for cyber risk, comprising:
   implementing a structural percolation model that considers a physical layer of a network and assumes a tree network topology to model loss, including:
      generating a random tree graph associated with a network topology, including
         specifying a number of random trees to be constructed;
         specifying the values of parameters that characterize each of the plurality of simulations concerning random trees;
         applying a command for sampling from a multinomial distribution, based on the above parameters, to generate a plurality of offsprings starting from the root of the random tree in a particular simulation;
         applying a loop that iterates through levels of the random tree in the particular simulation; and
         as tree grows, labeling every vertex in the random tree by a unique integer in ordered manner;
      assigning a data asset to each node of the random tree graph related to a corresponding node of a plurality of network topology nodes associated with the network topology;
   representing the data asset as a random variable;
   defining a contagion process stemming from an event of a breach of a node of the plurality of network topology nodes given a particular temporal instance of the network topology; and
   summing all losses, given a particular node of the plurality of network topology nodes where an infection starts and a realization of the contagion process to characterize one observation point in aggregate loss distribution due to breach.

* * * * *